United States Patent
Uematsu et al.

(10) Patent No.: US 7,075,278 B2
(45) Date of Patent: Jul. 11, 2006

(54) SWITCHING POWER SUPPLY CONTROLLER AND SWITCHING POWER SUPPLY

(75) Inventors: Takeshi Uematsu, Tokyo (JP); Hiroshi Kawasaki, Tokyo (JP); Takakazu Imai, Tokyo (JP); Koichiro Miura, Tokyo (JP); Ken Matsuura, Tokyo (JP)

(73) Assignee: TDK Corporation, Tokyo (JP)

( * ) Notice: Subject to any disclaimer, the term of this patent is extended or adjusted under 35 U.S.C. 154(b) by 231 days.

(21) Appl. No.: 10/797,150

(22) Filed: Mar. 11, 2004

(65) Prior Publication Data

US 2004/0178783 A1 Sep. 16, 2004

(30) Foreign Application Priority Data

Mar. 13, 2003 (JP) ......................................... 2003-068486
Mar. 18, 2003 (JP) ......................................... 2003-074275

(51) Int. Cl.
*G05F 1/40* (2006.01)

(52) U.S. Cl. ........................................ 323/282; 323/284
(58) Field of Classification Search ................. 323/282, 323/283, 284, 285, 351; 363/62
See application file for complete search history.

(56) References Cited

U.S. PATENT DOCUMENTS

| | | | | |
|---|---|---|---|---|
| 6,017,755 A | * | 1/2000 | Wrana et al. | ............. 435/320.1 |
| 6,844,710 B1 | * | 1/2005 | Lipcsei et al. | ............... 323/284 |
| 6,861,826 B1 | * | 3/2005 | Lynch | ......................... 323/224 |

FOREIGN PATENT DOCUMENTS

| | | |
|---|---|---|
| JP | 2000-116182 | 4/2000 |
| JP | 2002-530036 | 9/2002 |
| JP | A 2002-530036 | 9/2002 |
| JP | 2002-354787 | 12/2002 |
| WO | WO 00/26740 | 5/2000 |

* cited by examiner

*Primary Examiner*—Adolf Berhane
(74) *Attorney, Agent, or Firm*—Oliff & Berridge, PLC

(57) ABSTRACT

A controller 7A for generating a drive signal (PWM signal) PS for controlling a switching power supply, comprises control signal setting means 10, 11 for setting a control signal CS on the basis of an output voltage Vo and a target voltage Vr; current estimating means 12 for estimating an inductor current on the basis of the drive signal PS and for generating an estimated current signal PC; DC component removing means 14, 15 for extracting a DC component DC included in the estimated current signal PC and for removing the DC component DC from the estimated current signal PC; DC component resetting means 13, 14 for resetting the extracted DC component DC every predetermined time; and comparing means 16 for comparing the control signal CS with the estimated current signal PC' after the removal of the DC component DC.

19 Claims, 17 Drawing Sheets

SWITCHING POWER SUPPLY CONTROLLER AND SWITCHING POWER SUPPLY

BACKGROUND OF THE INVENTION

1. Field of the Invention

The present invention relates to a switching power supply controller and a switching power supply.

2. Related Background Art

A switching power supply has such properties as small size, light weight, and high efficiency and is commonly used as a power supply for microcomputers as incorporated in various devices, personal computers, and so on. These personal computers and others are progressively advancing toward lower voltage and higher processing speed, while increasing the consumption current more and more. In the switching power supply, therefore, the load current suddenly increases or decreases according to the processing load in the personal computers and others. The switching power supply possesses the property of capability of readily adapting to a wide input voltage range and is also utilized as a power supply applicable in several countries in the world or as a power supply with a wide specification setting of input voltage. The switching power supply needs to keep its output voltage constant so as to provide a target voltage according to the load of the personal computer or the like, in order to operate the personal computer or the like stably, and thus needs to insure the stable output voltage against change of the load current and input voltage. Furthermore, even if the output voltage is in a transient response state to a sudden change of the load current or the input voltage, the switching power supply must recover quickly into a stable state.

For this reason, the switching power supply is equipped with a controller such as a controller IC [Integrated Circuit] or the like of a digital control system, and this controller quickly turns switching elements such as FETs [Field Effect Transistors] or the like on and off. In order to keep the output voltage constant, the controller adopts the feedback control based on voltage mode control or current mode control to generate a PWM [Pulse Width Modulation] signal for turning the switching elements on and off on the basis of the output voltage or the like of the switching power supply.

For example, where the control is based on the current mode control by P [Proportional] control, the controller compares a current signal resulting from detection of an electric current flowing through an inductor of a smoothing circuit, with a target current signal and generates the PWM signal to provide a high signal during a period before the inductor current signal reaches the target current signal, and then provide a low signal during a period thereafter. In the current mode control, as described, the magnitude of the electric current flowing through the inductor is controlled based on the detected value of the current flowing through the inductor and the target value, thereby implementing the control to keep the output voltage constant. The target current signal is a signal obtained by subtracting the output voltage detected in the switching power supply, from the target voltage and multiplying the difference by a gain of P control.

The current mode control as described above can be implemented in either of digital control and analog control. In the digital control system, the output voltage and inductor current need to be subjected to A/D conversion from an analog signal to a digital signal, and then their digital signals are fed into the controller. Therefore, where the current mode control is implemented by the digital control, the inductor current increases or decreases according to fast on/off of the switching elements, and thus the A/D conversion causes values of digital signal after the conversion to lag behind values of actual current, thus producing error from the actual current. For this reason, the controller performs the comparison process, using the inductor current containing the time lag due to the A/D conversion, so that it fails to produce the PWM signal corresponding to the electric current actually flowing through the inductor. In this manner, the error due to the lag can be a factor to adversely affect the switching power supply required to demonstrate stable fast response. In this connection there is a controller configured to estimate the inductor current from the PWM signal generated inside the controller, instead of the digital signal (real current) after the A/D conversion, and perform the current mode control through the use of the estimated current (JP-A-2002-530036). In the technology described in this patent document, the estimated current is generated by estimating the electric current flowing through the inductor in the voltage regulator, and the output voltage of the voltage regulator is controlled constant on the basis of the estimated current.

SUMMARY OF THE INVENTION

However, since the estimated current is generated without taking account of the influence from various loads in the circuit of the switching power supply, it includes a large DC component relative to the actual inductor current, so as to produce error between the estimated current and the real current, which results in failure in generating the PWM signal with a high degree of accuracy. In the technology described in the above patent document, therefore, a current detector is provided in order to overcome the error, the electric current flowing through the inductor is detected by this current detector, and the value of the estimated current is corrected to the value of real current twice per switching period, based on the real current detected by the current detector. Namely, the technology described in the above patent document requires the provision of the current detector for the correction of the estimated current. It also necessitates the means for detecting the current of the inductor, for executing the current mode control using the actual inductor current. For this reason, while there are demands for compact size and light weight, the switching power supply needs to have the current detecting means in the current mode control, as compared with the voltage mode control, and thus becomes larger and more complex in the circuit configuration.

It is, therefore, an object of the present invention to provide a switching power supply controller and a switching power supply capable of implementing the current mode control without need for the inductor current detecting means and achieving a more simplified configuration of the switching power supply in digital control.

A switching power supply controller according to the present invention is a switching power supply controller comprising: control signal setting means for setting a control signal on the basis of an output voltage digitally converted in a switching power supply and a target voltage; current estimating means for estimating an electric current flowing through an inductor of a smoothing circuit in the switching power supply, on the basis of a drive signal for controlling a switching element of the switching power supply, and for generating an estimated current signal; DC component removing means for extracting a DC component included in the estimated current signal estimated by the current estimating means and for removing the DC component from the estimated current signal; DC component resetting means for resetting the DC component extracted by the DC component removing means, every predetermined time; and comparing means for comparing the control signal set by the control signal setting means, with the estimated current signal after the removal of the DC component by the DC component removing means, and for detecting whether the estimated current signal after the removal of the DC component reaches the control signal.

In order to control the output voltage to the target voltage by the feedback control based on the current mode control, the switching power supply controller receives the output voltage from the switching power supply after the A/D conversion and generates the control signal from the output voltage and the target voltage by the control signal setting means. In the controller, the drive signal is fed back to the current estimating means, and the current estimating means estimates the inductor current in the switching power supply on the basis of the drive signal to generate the estimated current signal. Furthermore, in the controller the DC component removing means extracts the DC component from the estimated current signal and removes the DC component from the estimated current signal. On this occasion, in the controller the DC component resetting means resets the extracted DC component every predetermined time. In the controller, thereafter, the comparing means receives the estimated current signal after the removal of the DC component and the control signal and compares the estimated current signal after the removal of the DC component with the control signal, to determine whether the estimated current signal after the removal of the DC component reaches the control signal. Then, in the controller the drive signal is generated so as to provide a signal to turn the switching element on during the period before the estimated current signal after the removal of the DC component reaches the control signal and a signal to turn the switching element off in the period thereafter. In this manner, since this controller is configured to generate the estimated current signal from the drive signal generated in the controller and perform the current mode control using this estimated current signal, there occurs no process lag due to the A/D conversion. In addition, since the controller is configured to extract the DC component from the estimated current signal and use the estimated current signal after the removal of the DC component, it can reduce the difference of the DC component from that of the actual inductor current. Particularly, since the controller is configured to reset the extracted DC component every predetermined time, it can reset the DC component accumulated in the DC component removing means. Therefore, the controller, which is not provided with the means for detecting the inductor current, is able to perform the current mode control based on the estimation of the inductor current, obtain the highly accurate estimated current, and generate the drive signal with a high degree of accuracy. In passing, if the accumulated DC component should not be reset, the estimated current signal would become infinitely large, and the controller would fall into an uncontrollable state.

The drive signal is a signal for switching the switching element of the switching power supply on and off, e.g., a PWM signal. The control signal is a signal for effecting the feedback control based on the current mode control, signal based on the output voltage actually detected in the switching power supply, and the target voltage, and signal fed into the comparing means and compared with the estimated current signal after the removal of the DC component. The estimated current signal is a signal for effecting the feedback control based on the current mode control, and estimated signal of the inductor current of the switching power supply on the basis of the drive signal. The predetermined time is a time indicating a time interval for resetting the DC component extracted in the DC component removing means, and is set in consideration of the capacitance of an output-side capacitor in the switching power supply, the zero-cross frequency in the controller, and so on.

The above switching power supply controller of the present invention may be configured so that the DC component removing means comprises: a low-pass filter for extracting the DC component from the estimated current signal; and a subtractor for subtracting the DC component extracted by the low-pass filter, from the estimated current signal generated by the current estimating means.

This switching power supply controller comprises the digital low-pass filter and subtractor as a specific configuration of the DC component removing means. In the controller the low-pass filter extracts the DC component from the estimated current signal and the subtractor subtracts the extracted DC component from the estimated current signal.

The above switching power supply controller of the present invention may also be configured so that the DC component resetting means feeds a reset signal to the low-pass filter and resets an output from a delay device of the low-pass filter every predetermined time.

This switching power supply controller is configured to feed the reset signal to the low-pass filter and reset the output from the delay device of the low-pass filter in accordance with this reset signal, thereby resetting the DC component being the output of the low-pass filter. In this manner, where the DC component is extracted by the digital low-pass filter, the controller is able to easily reset the DC component by feeding the reset signal to the low-pass filter.

The reset signal is a signal for resetting the DC component extracted by the low-pass filter, in which a signal for resetting it every predetermined time is set.

In the above switching power supply controller of the present invention, preferably, the predetermined time is an integral multiple of a period of the drive signal.

In this switching power supply controller, the predetermined time for resetting of the DC component is set to be the integral multiple of the period of the drive signal, whereby means for setting the predetermined time can be simply configured, for example, by a counter for counting the number of cycles of the drive signal.

The above switching power supply controller of the present invention may be configured so that the current estimating means comprises an up-down counter for counting up every given time on the basis of an up coefficient during an on period of the switching element in the drive signal and for counting down every given time on the basis of a down coefficient during an off period of the switching element in the drive signal.

This switching power supply controller comprises the up-down counter as a specific configuration of the current estimating means. In this controller, the drive signal is fed back to the up-down counter, and the up-down counter counts the on period of the switching element in the drive signal up according to the up coefficient every given time of a master clock or the like in the controller, and counts the off period down according to the down coefficient every given time, to generate the estimated current signal. In the controller, as described above, the current estimating means can be readily configured by the up-down counter.

The up coefficient is a coefficient indicating an increase rate of the electric current flowing through the inductor of the smoothing circuit in the switching power supply during the on period of the switching element in the drive signal, and is set based on parameters of respective devices in the smoothing circuit, the given time in the counting, and so on. The down coefficient is a coefficient indicating a decrease rate of the electric current flowing through the inductor of the smoothing circuit in the switching power supply during the off period of the switching element in the drive signal, and is set based on the parameters of the respective devices in the smoothing circuit, the given time in the counting, and so on.

Another switching power supply controller according to the present invention is a switching power supply controller comprising: drive signal generating means for generating a drive signal to be outputted to a switching power supply; pulse signal outputting means for outputting a pulse signal having a predetermined level value corresponding to an output level of the drive signal generated by the drive signal generating means; high-pass filter means for removing a DC component included in the pulse signal outputted by the pulse signal outputting means; and integrating means for integrating a signal resulting from the removal of the DC component by the high-pass filter means, wherein the drive signal generating means generates the drive signal on the basis of signals indicating an output voltage of the switching power supply and a target voltage for the output voltage and on the basis of a signal resulting from the integration by the integrating means.

In this switching power supply controller, the pulse signal outputting means outputs the pulse signal with the predetermined level value corresponding to the output level of the drive signal, and thus it is able to output the pulse signal, for example, corresponding to level values indicating slopes in increase and in decrease of the estimated current. The high-pass filter means removes the DC component from the pulse signal and the integrating means integrates the signal after the removal of the DC component whereby the signal after the integration (e.g., the estimated current signal) can be prevented from diverging because of the influence of the DC component and whereby the error due to the influence of the DC component can be minimized. This yields the signal after the integration (e.g., the estimated current signal) as a signal closer to the real current. Since the drive signal is generated based on the signal as described above, it becomes feasible to perform the control closer to the current mode control using the real current, and the switching power supply required to have quick response, can be made to perform stabler constant voltage control.

In the above switching power supply controller of the present invention, preferably, the high-pass filter means is a second or higher-order high-pass filter. This configuration permits the switching power supply controller to remove the DC component more certainly.

Still another switching power supply controller according to the present invention is a switching power supply controller comprising: drive signal generating means for generating a drive signal to be outputted to a switching power supply; pulse signal outputting means for outputting a pulse signal having a predetermined level value corresponding to an output level of the drive signal generated by the drive signal generating means; and calculation means integrally having a function of integrating the pulse signal outputted by the pulse signal outputting means and a high-pass filter function of removing a DC component from the pulse signal, wherein the drive signal generating means generates the drive signal on the basis of signals indicating an output voltage of the switching power supply and a target voltage for the output voltage and on the basis of a signal resulting from calculation by the calculation means.

In this switching power supply controller, the pulse signal outputting means outputs the pulse signal with the predetermined level value corresponding to the output level of the drive signal and thus it is able to output the pulse signal, for example, corresponding to level values indicating the slopes in increase and in decrease of the estimated current. Since the pulse signal with the predetermined level value is calculated by the calculation means integrally having the function of removing the DC component and the integrating function, the signal after the calculation (e.g., the estimated current signal) can be prevented from diverging because of the influence of the DC component and the error due to the influence of the DC component can be minimized. This yields the signal after the integration (e.g., the estimated current signal) as a signal closer to the real current. Since the drive signal is generated based on the signal as described above, it becomes feasible to perform the control closer to the current mode control using the real current, and the switching power supply required to have quick response, can be made to perform stabler constant voltage control.

In the above switching power supply controller of the present invention, preferably, the calculation means is configured based on a transfer function $H(Z)$ of the calculation means defined as follows: $H(Z)=1/(1-b*Z^{-1})$ or $H(Z)=(1-Z^{-1})/[(1-b1*Z^{-1})(1-b2*Z^{-1})]$ (b, b1, and b2 are coefficients)

Still another switching power supply controller according to the present invention is a switching power supply controller comprising: drive signal generating means for generating a drive signal to be outputted to a switching power supply; pulse signal outputting means for outputting a pulse signal having a predetermined level value corresponding to an output level of the drive signal generated by the drive signal generating means; a first high-pass filter for removing a DC component included in the pulse signal outputted by the pulse signal outputting means; integrating means for integrating a signal resulting from the removal of the DC component by the first high-pass filter; and a second high-pass filter for removing a DC component included in a signal resulting from the integration by the integrating means, wherein the drive signal generating means generates the drive signal on the basis of signals indicating an output voltage of the switching power supply and a target voltage for the output voltage and on the basis of a signal resulting from the removal of the DC component by the second high-pass filter.

In this switching power supply controller, the pulse signal outputting means outputs the pulse signal with the predetermined level value corresponding to the output level of the drive signal and it is thus able to output the pulse signal, for example, corresponding to level values indicating slopes in increase and in decrease of the estimated current. The first high-pass filter and second high-pass filter remove the respective DC components before and after the integration of the signal by the integrating means, whereby the DC component is removed more certainly. Therefore, the signal outputted by the second high-pass filter (e.g., the estimated current signal) can be prevented from diverging because of the influence of the DC component, and the error due to the influence of the DC component can be minimized. This yields the signal after the integration (e.g., the estimated current signal) as a signal closer to the real current. Since the drive signal is generated based on the signal as described above, it becomes feasible to perform the control closer to the current mode control using the real current, and the switching power supply required to have quick response, can be made to perform stabler constant voltage control.

In the above switching power supply controller of the present invention, preferably, the first high-pass filter and the second high-pass filter are first-order high-pass filters. This simplifies the circuit configuration more.

In the above switching power supply controller of the present invention, preferably, the drive signal generating means comprises: comparing means for comparing a signal indicating a difference between the output voltage and the target voltage, with the signal resulting from the removal of the DC component; and switching means for switching the level of the drive signal from a low level to a high level at a predetermined interval and for switching the level of the drive signal from the high level to the low level on the basis of a result of the comparison by the comparing means. This permits the controller to control a period in which the level of the drive signal is the high level, based on the result of the comparison between the difference signal between the output voltage and the target voltage, and the signal with less error after the removal of the DC component.

A switching power supply according to the present invention is a switching power supply comprising: a controller for generating a drive signal for switching control of a switching element by digital control; and a switching element configured to turn on and off based on the drive signal generated by the controller, wherein the controller is any one of the above-described controllers.

The switching power supply is configured so that the controller is constructed in the configuration of one of the above controllers and the switching element is switched on and off by the drive signal generated based on the estimated current signal estimated from the drive signal. In this switching power supply, the input voltage is converted into the output voltage by on/off of the switching element so as to achieve the target voltage. Thanks to the control by the above controller, the switching power supply is able to switch the switching element on and off by the feedback control based on the current mode control, without need for the means for detecting the inductor current.

DESCRIPTION OF THE PREFERRED EMBODIMENTS

Embodiments of the switching power supply controller and the switching power supply according to the present invention will be described below with reference to the drawings.

In the present embodiment, the switching power supply according to the present invention is applied to a buck DC/DC converter, and the switching power supply controller according to the present invention is applied to a controller IC which generates the PWM signal for controlling switching elements of the DC/DC converter. The controller IC of the present embodiment is of a digital control type to implement fast processing, and performs the feedback control of the DC/DC converter by the current mode control using the estimated current signal resulting from the estimation of the inductor current based on the PWM signal. The present embodiment involves two embodiments different in structure of the controller IC. In the description hereinafter, the DC/DC converter will be first described, and then the controller ICs of the respective embodiments will be described in order.

Figure 1:
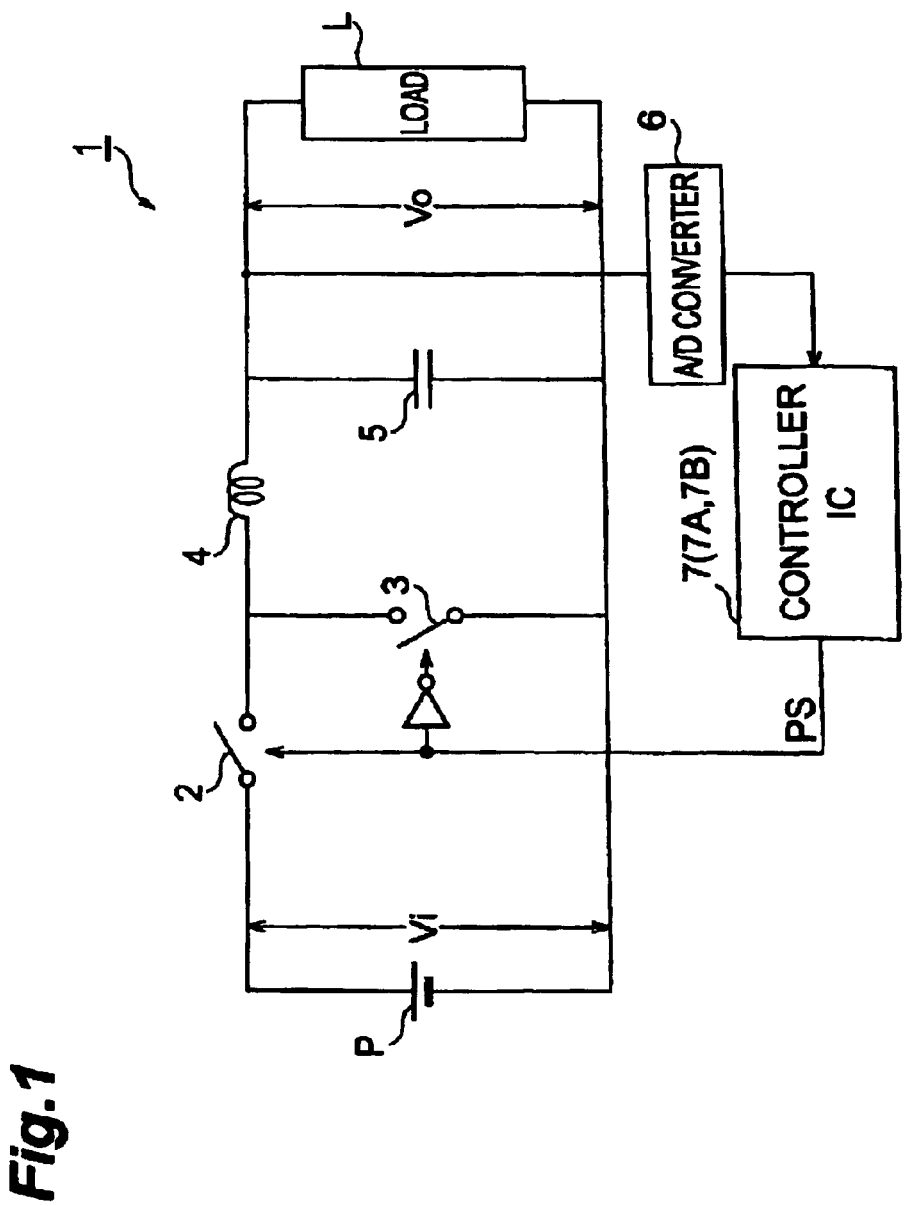
FIG. 1 is an illustration showing a configuration of a DC-to-DC (DC/DC) converter according to an embodiment of the present invention.

The configuration of the DC/DC converter 1 will be described with reference to FIG. 1. FIG. 1 is a configuration diagram of the DC/DC converter.

The DC/DC converter 1 is a power supply circuit for converting a DC input voltage Vi into a DC output voltage Vo (<Vi) and can be used in various applications, e.g., in a VRM [Voltage Regulator Module]. The DC/DC converter 1 is a switching regulator for switching the switching elements on and off by PWM control. A power supply P applies the input voltage Vi to the DC/DC converter 1. The input voltage Vi is variable and an input voltage range (e.g., 5–12 V) is set for it. A load L is a recipient of the output voltage Vo outputted from the DC/DC converter 1. For the output voltage Vo, a constant target voltage (e.g., 1 V) is set according to the load L. The load L is a load which represents a CPU [Central Processing Unit], an MPU [Micro Processing Unit], or a DSP [Digital Signal Processor] in communication equipment such as computers, routers, etc. and which largely varies its load current according to the processing load. The CPU and MPU as listed have the power-saving mode and have the feature of rapidly increasing the load variation during a transition from the power-saving mode to the normal mode.

The DC/DC converter 1 is mainly composed of two switching elements 2, 3, an inductor 4, a capacitor 5, an A/D converter 6, and a controller IC 7.

The switching elements 2, 3 are elements having the switching function and are, for example, transistors such as field effect transistors (FETs) or the like. Gates of the switching elements 2, 3 receive a PWM signal (drive signal) PS outputted from the controller IC 7. The switching element 2 and switching element 3 are alternately switched on and off based on levels of the PWM signal PS. Specifically, with the PWM signal PS at a high level, the switching element 2 turns on while the switching element 3 off. On the other hand, with the PWM signal PS at a low level, the switching element 2 turns off while the switching element 3 on.

The inductor 4 and capacitor 5 function as a smoothing circuit (LC filter) for stabilizing the output voltage Vo. The switching operation of the switching elements 2, 3 results in feeding a pulsed voltage with amplitude equal to the input voltage Vi to the smoothing circuit, and the smoothing circuit averages the pulsed voltage.

The A/D converter 6 converts an analog output voltage Vo detected by a voltage sensor (not shown), into a digital output voltage Vo and outputs the digital output voltage Vo to the controller IC 7.

The controller IC 7 generates the PWM signal by the current mode control on the basis of the digital output voltage Vo so as to make the output voltage Vo equal to the target voltage, and controls on/off of the switching elements 2, 3.

Figure 2:
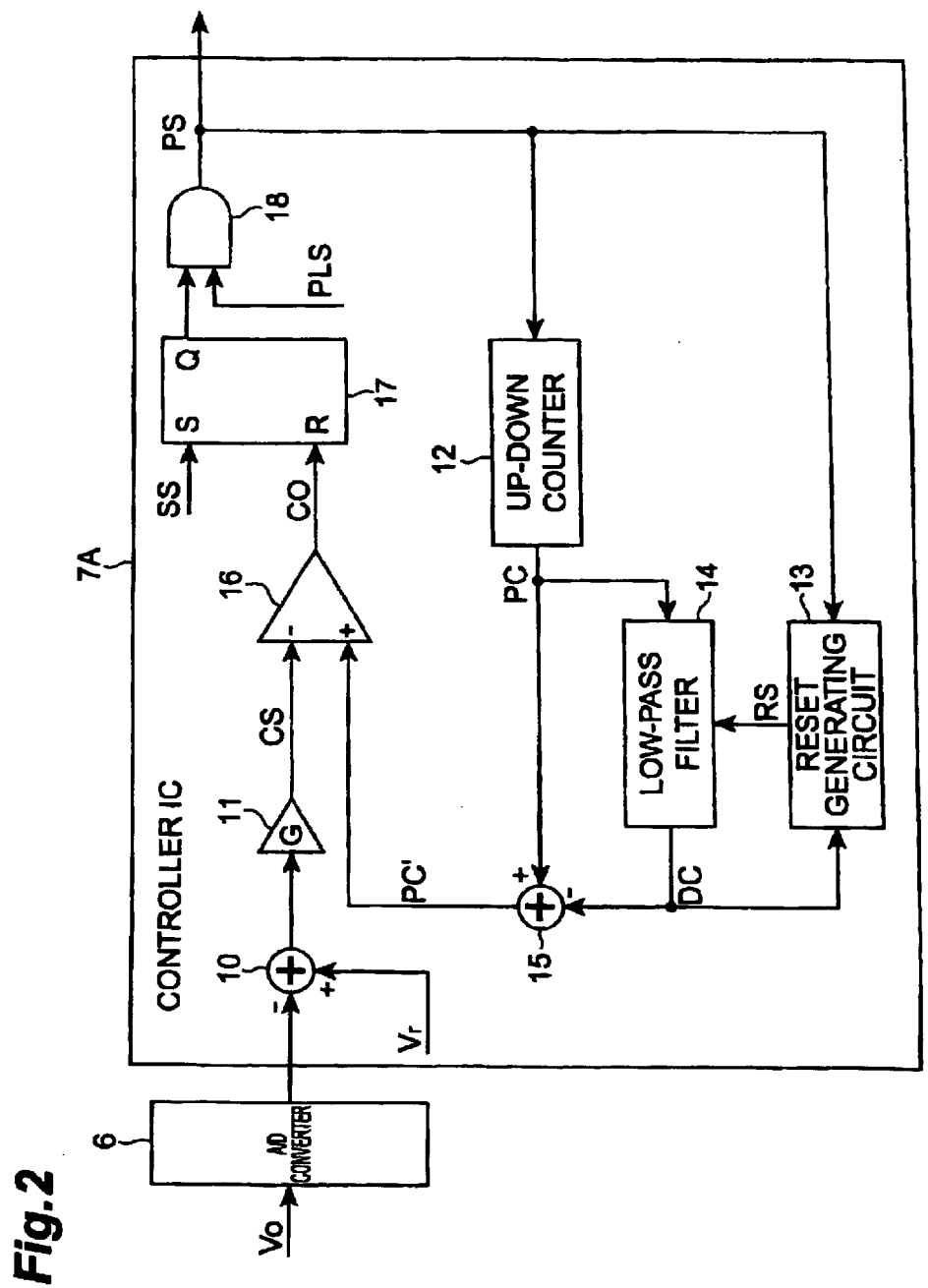
FIG. 2 is a circuit diagram showing a circuit configuration of the controller IC according to the first embodiment.
Figure 3A:
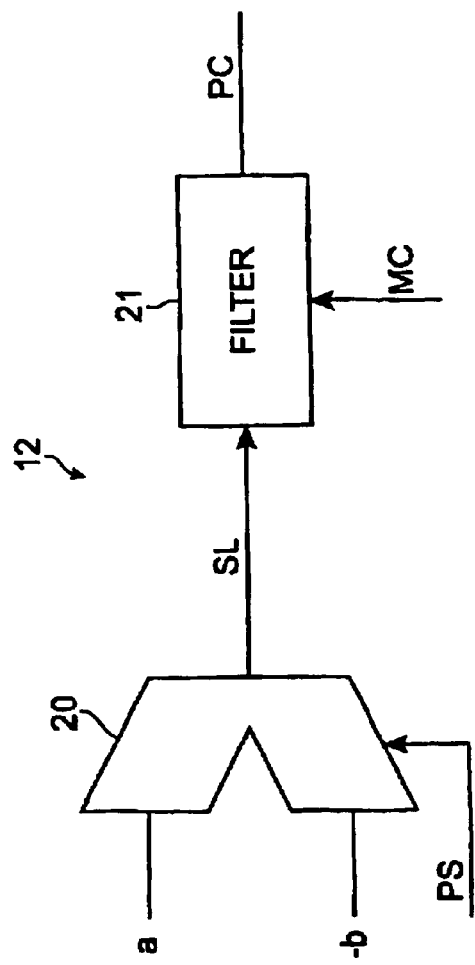
FIG. 3A is a circuit diagram showing a detailed circuit configuration of an up-down counter in FIG. 2.
Figure 3B:
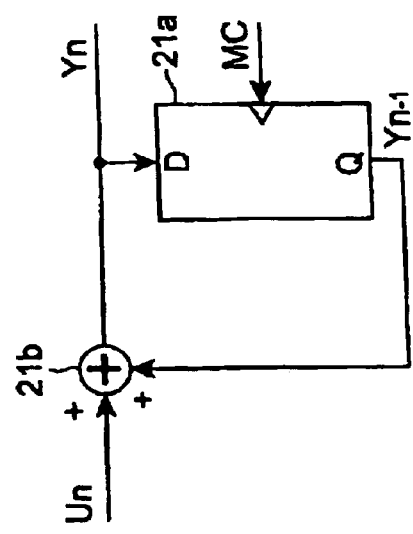
FIG. 3B is a circuit diagram showing a detailed circuit configuration of a filter in FIG. 3A.
Figure 4:
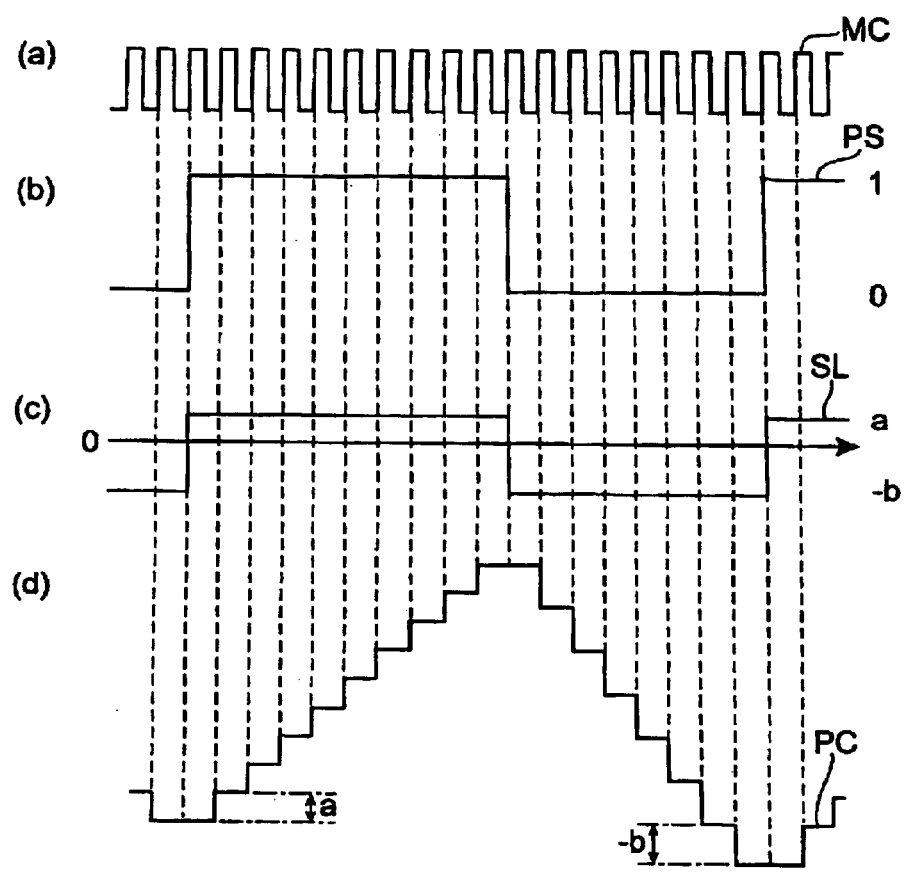
FIG. 4 is an illustration to illustrate generation of the estimated current signal in the up-down counter in FIG. 2, wherein (a) represents a master clock, (b) a PWM signal, (c) a select signal, and (d) the estimated current signal.
Figure 5:
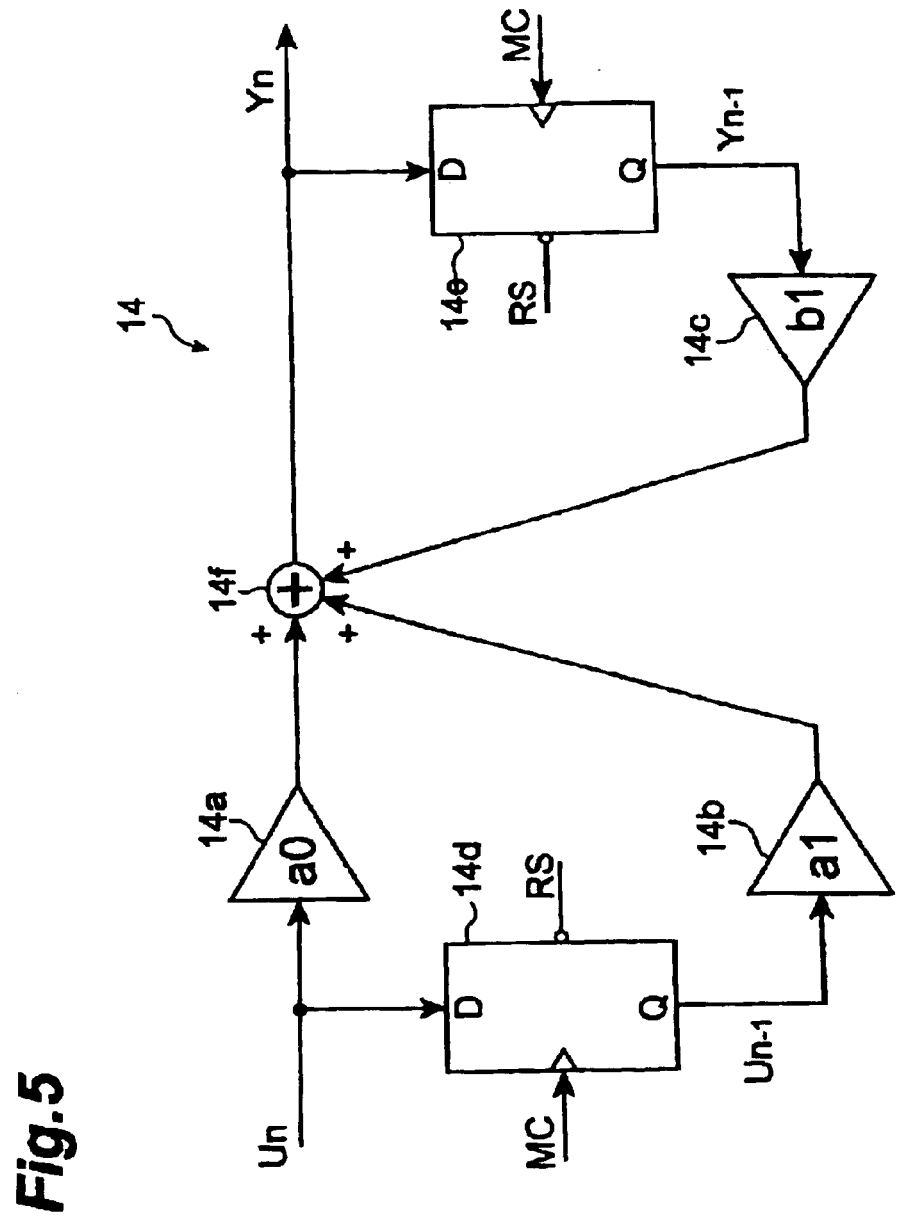
FIG. 5 is a circuit diagram showing the detailed circuit configuration of a low-pass filter in FIG. 2.
Figure 6:
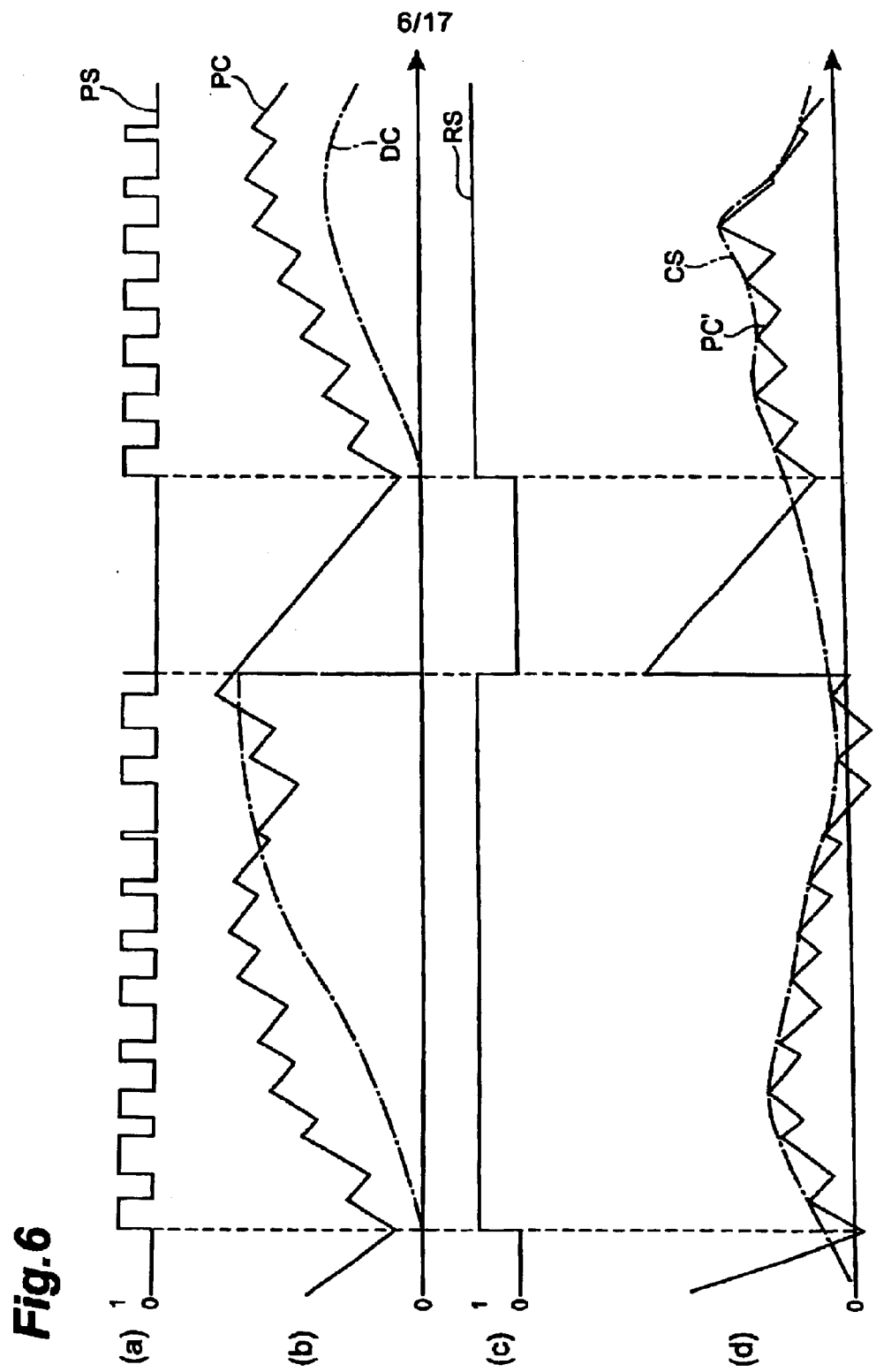
FIG. 6 is a timing chart of intermittently removing the DC component from the estimated current signal in the controller IC of FIG. 2 (where the DC component is larger than 0), wherein (a) represents the PWM signal, (b) the estimated current signal and DC component, (c) a reset signal, and (d) the estimated current signal after removal of the DC component, and a control signal.
Figure 7:
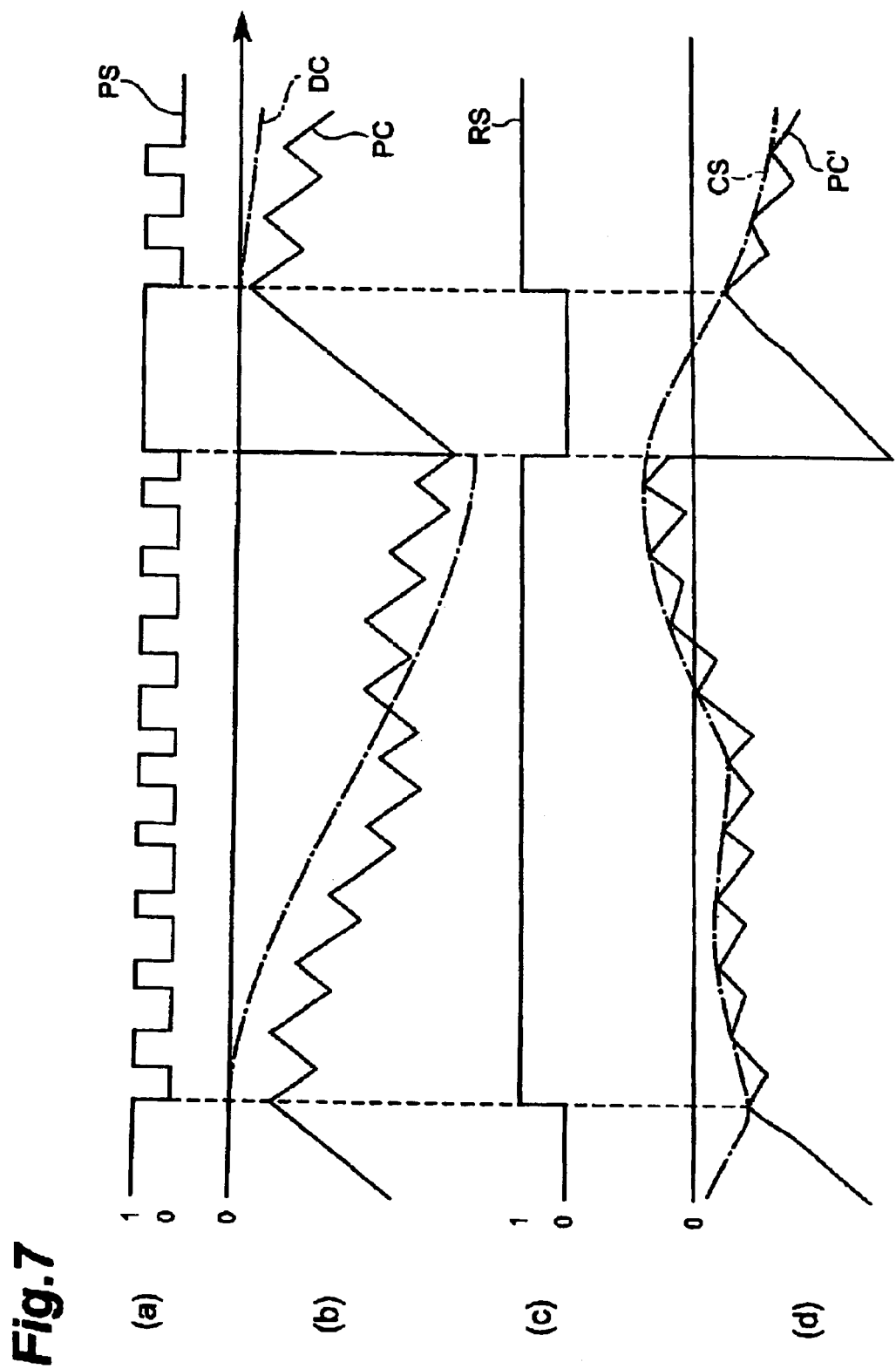
FIG. 7 is a timing chart of intermittently removing the DC component from the estimated current signal in the controller IC of FIG. 2 (where the DC component is not more than 0), wherein (a) represents the PWM signal, (b) the estimated current signal and DC component, (c) the reset signal, and (d) the estimated current signal after removal of the DC component, and the control signal.
Figure 8:
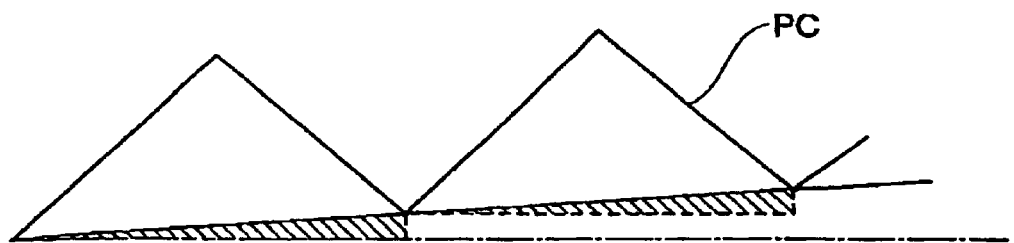
FIG. 8 is an illustration to illustrate the reason why the DC component is accumulated in the estimated current signal.
Figure 9:
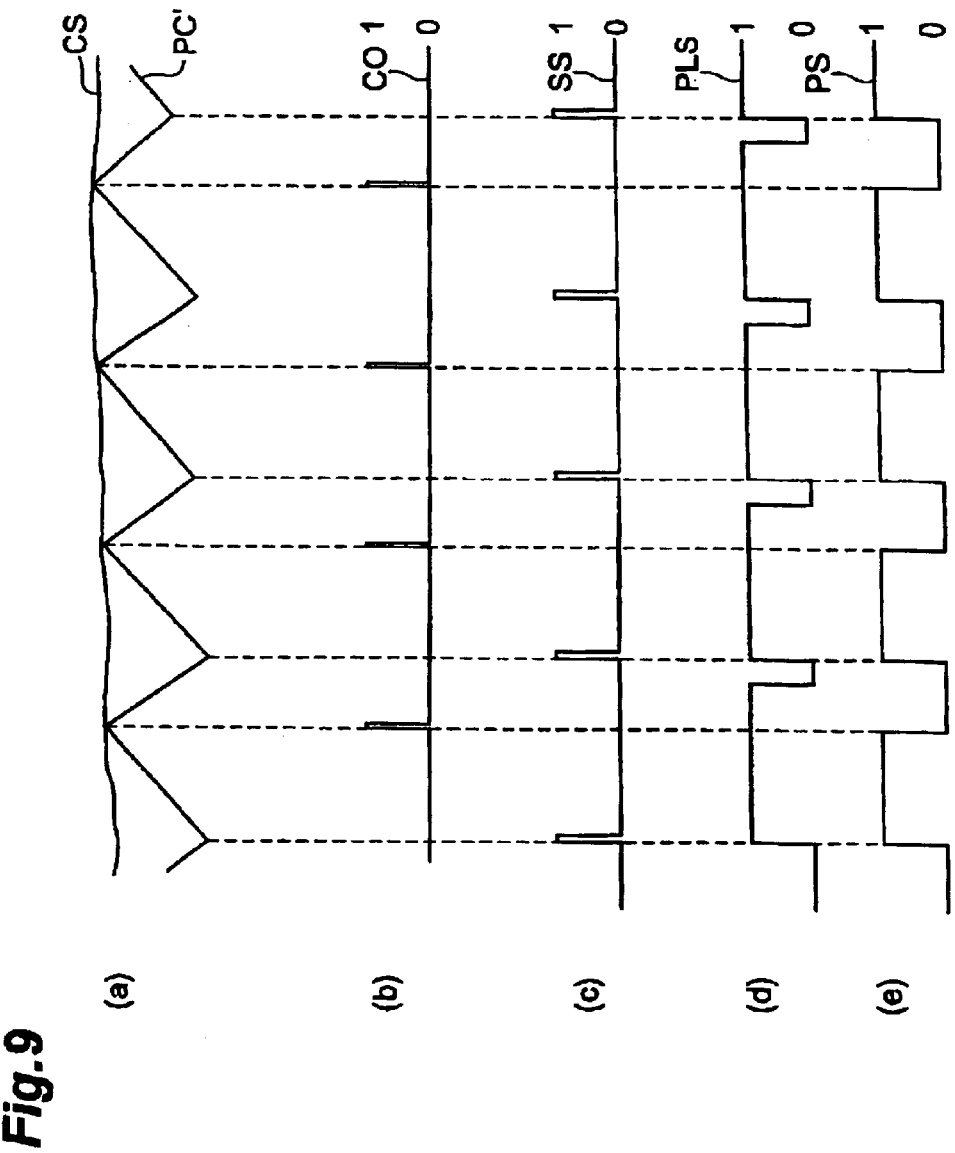
FIG. 9 is an illustration to illustrate the current mode control in the controller IC of FIG. 2, wherein (a) represents the control signal, and the estimated current signal after the removal of the DC component, (b) a comparator signal, (c) a set signal, (d) a pulse width limiting signal, and (e) the PWM signal.

The configuration of the controller IC 7A according to the first embodiment will be described with reference to FIGS. 2 to 9. FIG. 2 is a circuit diagram showing the circuit configuration of the controller IC according to the first embodiment. FIG. 3A is a circuit diagram showing the detailed circuit configuration of the up-down counter in FIG. 2, and FIG. 3B a circuit diagram showing the detailed circuit configuration of the filter in FIG. 3A. FIG. 4 is an illustration to illustrate the generation of the estimated current signal in the up-down counter in FIG. 2, wherein (a) represents the master clock, (b) the PWM signal, (c) the select signal, and (d) the estimated current signal. FIG. 5 is a circuit diagram showing the detailed circuit configuration of the low-pass filter in FIG. 2. FIG. 6 is a timing chart of intermittently removing the DC component from the estimated current signal in the controller IC of FIG. 2 (where the DC component is larger than 0), wherein (a) represents the PWM signal, (b) the estimated current signal and DC component, (c) the reset signal, and (d) the estimated current signal after the removal of the DC component, and the control signal. FIG. 7 is a timing chart of intermittently removing the DC component from the estimated current signal in the controller IC of FIG. 2 (where the DC component is not more than 0), wherein (a) represents the PWM signal, (b) the estimated current signal and DC component, (c) the reset signal, and (d) the estimated current signal after the removal of the DC component, and the control signal. FIG. 8 is an illustration for explaining the reason why the DC component is accumulated in the estimated current signal. FIG. 9 is an illustration to illustrate the current mode control in the controller IC of FIG. 2, wherein (a) represents the control signal and the estimated current signal after the removal of the DC component, (b) the comparator signal, (c) the set signal, (d) the pulse width limiting signal, and (e) the PWM signal.

The controller IC 7A is a digital circuit that operates based on, the master clock (e.g., 10 MHz to 100 MHz) (cf. FIG. 2). The controller IC 7A multiplies a difference between the digital output voltage Vo after the conversion in the A/D converter 6 and the target voltage Vr with the gain G of P control to generate a control signal CS, by the feedback control based on the P control. In the controller IC 7A, the generated PWM signal PS is fed back through a minor loop and an estimated current signal PC as an estimation of the electric current flowing through the inductor 4 of the DC/DC converter 1 is generated on the basis of the generated PWM signal PS. Furthermore, in the controller IC 7A the DC component DC is removed from the estimated current signal PC and the accumulated DC component DC is intermittently reset to 0 to generate an estimated current signal PC' after the removal of the DC component DC. Then in the controller IC 7A the PWM signal PS is generated from the control signal CS and the estimated current signal PC'. For that, the controller IC 7A is composed of a subtractor 10, a multiplier 11, an up-down counter 12, a reset generating circuit 13, a low-pass filter 14, a subtractor 15, a comparator 16, an RS flip-flop circuit 17, and an AND circuit 18. In the description hereinafter the high signal is set at the power-supply voltage (e.g., 5 V) or the like in the controller IC 7A and is indicated by 1 in the drawings. The low signal is set at 0 V and is indicated by 0 in the drawings.

In the first embodiment, the subtractor 10 and multiplier 11 correspond to the control signal setting means as stated in the claims, the up-down counter 12 to the current estimating means in the claims, the low-pass filter 14 and subtractor 15 to the DC component removing means in the claims, the reset generating circuit 13 and low-pass filter 14 to the DC component resetting means in the claims, and the comparator 16 to the comparing means in the claims.

The subtractor 10 receives the target voltage Vr and output voltage Vo, subtracts the output voltage Vo from the target voltage Vr, and outputs the difference (Vr−Vo) to the multiplier 11.

The multiplier 11 receives the difference (Vr−Vo), multiplies the difference (Vr−Vo) by the gain G of P control, and outputs the product G(Vr−Vo) as a control signal CS to the comparator 16. This control signal CS is a target current signal in comparison with the estimated current signal PC'.

The up-down counter 12 generates the estimated current signal PC on the basis of the PWM signal PS and outputs the estimated current signal PC to the low-pass filter 14 and to the subtractor 15. For that purpose, the up-down counter 12 is composed of a selector 20 and a filter 21 (cf. FIG. 3A). The estimated current signal PC is a signal as an estimation of the electric current flowing through the inductor 4 of the DC/DC converter 1, and signal which increases based on an up coefficient during an on period (high signal period) of the switching element 2 by the PWM signal PS and which decreases on the basis of a down coefficient during an off period (low signal period) thereof.

The selector 20 generates a select signal SL on the basis of the PWM signal PS. For that, the selector 20 receives the PWM signal PS generated in the controller IC 7A. When the PWM signal PS is at the high level, the selector 20 selects the up coefficient (=a) and sets a in the select signal SL (cf. FIGS. 4(*b*) and (*c*)). When the PWM signal PS is at the low level, the selector 20 selects the down coefficient (=−b) and sets −b in the select signal SL (cf. FIGS. 4(*b*) and (*c*)).

The up coefficient a and the down coefficient −b are set based on the parameters of the inductor 4 and capacitor 5 in the DC/DC converter 1, one cycle of the master clock MC, etc. and are values indicating an increasing rate or a decreasing rate of the inductor current in the DC/DC converter 1. These coefficients a, b are set without consideration to the resistance component in the inductor 4 in the actual DC/DC converter 1, variation of the input voltage Vi, and so on. Therefore, the estimated current signal PC resulting from the estimation using these coefficients a, b deviates from the actual inductor current and involves an error component (DC component).

The filter 21 is a filter having the integrating characteristic and generates the estimated current signal PC based on the select signal SL. The filter 21, as shown in FIG. 3B, is composed of a D flip-flop circuit 21*a* and an adder 21*b*. The D flip-flop circuit 21*a* receives an output value $Y_n$, retains a right previous value $Y_{n-1}$ of the output value on the basis of the master clock MC, and outputs $Y_{n-1}$ to the adder 21*b*. The adder 21*b* adds the right previous value $Y_{n-1}$ of the output value to the input value $U_n$ and outputs the result as an output value $Y_n$. Specifically, the filter 21 sequentially adds the value of the select signal SL to the previous value every cycle of the master clock MC and outputs the sum as an estimated current signal PC (cf. FIGS. 4(*a*), (*c*), and (*d*)). Namely, where the select signal SL is the value of a, a is added to the previous value; where the select signal SL is the value of −b, b is subtracted from the previous value.

$$Y_n = U_n + Y_{n-1} \quad (1)$$

The filter 21 is expressed by Eq (1), wherein $U_n$ represents the select signal SL from the selector 20 and $Y_n$ the estimated current signal PC.

The reset generating circuit 13 generates a reset signal RS that defines the timing of resetting the DC component DC to be extracted in the low-pass filter 14. For that, the reset generating circuit 13 receives the PWM signal PS generated in the controller IC 7A and the DC component DC extracted in the low-pass filter 14. For a reset release period with no reset, the reset generating circuit 13 sets the reset signal RS at the high level (cf. FIG. 6(*c*) and FIG. 7(*c*)). The reset generating circuit 13 counts the number of cycles of the PWM signal PS (rises from the low level to the high level) and, when the count value reaches 10 (i.e., when a time equivalent to ten cycles of the PWM signal PS passes), the reset generating circuit 13 sets the reset signal RS at the low level in order to initiate a reset period (cf. FIG. 6(*a*), FIG. 6(*c*), FIG. 7(*a*), and FIG. 7(*c*)). After the setting at the low level, the reset generating circuit 13 determines whether the DC component DC is larger than 0. When the DC component DC is larger than 0, the reset generating circuit 13 determines whether the PWM signal PS had a rise from the low level to the high level. With a rise, the reset generating circuit 13 sets the reset signal RS to the high level in order to terminate the reset period (cf. FIGS. 6(*a*) and (*c*)). In passing, when the DC component is larger than 0 and when the reset signal RS turns to the low level, the estimated current signal PC' rapidly increases on the plus side to become greater than the control signal CS, and the PWM signal PS is at the low level (cf. FIGS. 6(*a*) and (*d*)). On the other hand, when the DC component DC is not more than 0, the reset generating circuit 13 determines whether the PWM signal PS had a fall from the high level to the low level. With a fall, the reset generating circuit 13 sets the reset signal RS to the low level in order to terminate the reset period (cf. FIGS. 7(*a*) and (*c*)). In passing, when the DC component is not more than 0 and when the reset signal RS turns to the low level, the estimated current signal PC' quickly decreases on the minus side to become smaller than the control signal CS, and the PWM signal PS is at the high level (cf. FIG. 7(*d*)). Then the reset generating circuit 13 outputs the reset signal RS to the low-pass filter 14.

A period in which the reset signal is low is a duration corresponding to a few cycles of the PWM signal PS and is determined by the magnitude of the accumulated DC component DC (consequently, the magnitude of the estimated current signal PC' after reset) and the magnitude of the control signal CS. The reason is that the PWM signal PS turns from the low level to the high level or from the high level to the low level after the values of the estimated current signal PC' and the control signal CS become equal to each other, and the time necessary for the turn increases with increasing difference between the values of the estimated current signal PC' and the control signal CS. For this reason, the period in which the reset signal is low (the reset period) is determined according to the relation between the estimated current signal PC' and the control signal CS after reset.

The timing of resetting the DC component DC is set to ten cycles of the PWM signal PS (i.e., ten switching cycles) herein, but the number of cycles is to be set according to the capacitance of the capacitor 5 in the DC/DC converter 1, the zero-cross frequency of the controller IC 7A, and so on. When the DC component DC is reset, a ripple component generated in the output voltage Vo in the DC/DC converter 1 varies depending upon the reset timing, and the ripple becomes greater as the reset period becomes shorter. This ripple is affected by the capacitance of the capacitor 5 and the zero-cross frequency, and the reset period can be set long where the capacitance of the capacitor 5 is large or where the zero-cross frequency is low.

The low-pass filter 14 is a first-order low-pass filter of the IIR [Infinite Impulse Response] type, and it extracts the DC component DC from the estimated current signal PC and resets the accumulated DC component DC to approximately 0 according to the reset signal RS. The low-pass filter 14, as shown in FIG. 5, is composed of three multipliers 14*a*, 14*b*, 14*c*, two D flip-flop circuits 14*d*, 14*e*, and an adder 14*f*. The multiplier 14*a* multiplies an input value $U_n$ by a filter coefficient a0 and outputs the product to the adder 14*f*. The D flip-flop circuit 14*d* receives the input value $U_n$, retains a right previous value $U_{n-1}$ of the input value on the basis of the master clock MC, and outputs $U_{n-1}$ to the multiplier 14*b*. The multiplier 14*b* multiplies the previous value $U_{n-1}$ of the input value by a filter coefficient a1 and outputs the product to the adder 1*f*. The D flip-flop circuit 14*e* receives an output value $Y_n$, retains a right previous value $Y_{n-1}$ of the output value on the basis of the master clock MC, and outputs $Y_{n-1}$ to the multiplier 14*c*. The multiplier 14*c* multiplies the right previous value $Y_{n-1}$ of the output value by a filter coefficient b1 and outputs the product to the adder 14f. The adder 14f sums up the products of the respective multipliers 14a–14c and outputs the result as an output value $Y_n$. The low-pass filter 14 has a cut-off frequency and extracts frequency components lower than the cut-off frequency in the estimated current signal PC, as the DC component DC (cf. FIG. 6(b) and FIG. 7(b)).

$$Y_n = a0 \times U_n + a1 \times U_{n-1} + b1 \times Y_{n-1} \quad (2)$$

The low-pass filter 14 is expressed by Eq (2), wherein $U_n$ represents the estimated current signal PC from the up-down counter 12 and $Y_n$ the DC component DC. This low-pass filter 14 has the gain set at 1, gradually extracts the DC component included in the estimated current signal PC with a lapse of time, and extracts the whole DC component in the estimated current signal PC after a certain time passes. Accordingly, as shown in FIG. 6(b) and FIG. 7(b), the DC component DC gradually increases from 0 after resets and the DC component DC nears the actual DC component of the estimated current signal PC with a lapse of time.

The low-pass filter 14 resets the accumulated DC component DC in the estimated current signal PC. For that, the low-pass filter 14 receives the reset signal RS. The D flip-flop circuit 14e receives the reset signal RS, outputs the right previous value $Y_{n-1}$ of the output value during a high period of the reset signal RS, and unconditionally outputs 0 during a low period of the reset signal RS. When the previous value $Y_{n-1}$ of the output value becomes 0, the low-pass filter 14 outputs the output value $Y_n$ (DC component DC) of approximately 0, because the filter coefficients a0 and a1 are values considerably smaller than 1 and the filter coefficient b1 is a value smaller than 1 but close to 1. When the reset signal RS turns from the low level to the high level, the D flip-flop circuit 14e outputs the previous value $Y_{n-1}$ of the output value. In the low-pass filter 14, with the output of the previous value $Y_{n-1}$ of the output value, the output value $Y_n$ (DC component DC) gradually approaches the actual DC component of the estimated current signal PC. It is also possible to adopt a configuration wherein the reset signal RS is also fed into the D flip-flop circuit 14d and it unconditionally outputs 0 when the reset signal RS turns to the low level.

Described below is why the DC component is accumulated in the estimated current signal PC. When the inductor current is estimated based on the PWM signal PS, the estimated current contains the DC component (error component) more than the actual inductor current. Thus the controller IC 7A is configured to extract the DC component DC from the estimated current signal PC and subtract the DC component DC from the estimated current signal PC. However, since the estimated current signal PC is generated by the filter 21 having the integrating characteristic, the DC component continuously increases (or decreases) with a predetermined slope in the estimated current signal PC, as indicated by hatched portions in FIG. 8. For this reason, supposing the DC component is extracted at a certain time t1 in the low-pass filter 14 and the subtractor 15 in the stage thereafter subtracts the extracted DC component at a time t2, the DC component at the time t2 in the estimated current signal PC becomes greater (or smaller) than the DC component at the certain time t1. Therefore, there remains the DC component continuously increasing (or decreasing) during the period from t1 to t2 even after the subtraction of the DC component, and the DC component is accumulated in the low-pass filter 14 to increase its amplitude on the plus side (or on the minus side). Therefore, if the DC component should not be reset, the estimated current signal PC and the DC component DC would infinitely increase their amplitude on the plus side or on the minus side, so as to disable the processing in the controller IC 7A.

The subtractor 15 receives the estimated current signal PC and the DC component DC, subtracts the DC component DC from the estimated current signal PC, and outputs the difference (PC−DC) as the estimated current signal PC' after the removal of the DC component. The subtractor 15 performs the subtraction process every cycle of the master clock MC. In passing, when the DC component DC is positive, the estimated current signal PC' after the removal of the DC component becomes smaller than the estimated current signal PC (cf. FIGS. 6(b) and (d)). When the DC component DC is negative, the estimated current signal PC' after the removal of the DC component becomes larger than the estimated current signal PC (cf. FIGS. 7(b) and (d)).

The comparator 16 determines whether the estimated current signal PC' after the removal of the DC component reaches the control signal CS, and generates a comparator signal CO. For that, the comparator 16 receives the estimated current signal PC' through a noninverting input terminal and receives the control signal CS through an inverting input terminal.

During a reset release period of the DC component DC, the comparator 16 compares the estimated current signal PC' with the control signal CS, outputs the comparator signal CO at the high level if the estimated current signal PC' reaches the control signal CS, and otherwise, outputs the comparator signal CO at the low level (cf. FIGS. 9(a) and (b)). The comparator signal CO is a signal that becomes high only for a moment when the estimated current signal PC' reaches the control signal CS, and is outputted to the RS flip-flop circuit 17. In passing, the estimated current signal PC' is generated so as to increase before arrival at the control signal CS and decrease thereafter.

During a reset period of the DC component DC, the estimated current signal PC' quickly increases its amplitude on the plus side or on the minus side, and it is thus infeasible to perform the control as during the reset release period. When the DC component DC is larger than 0, the estimated current signal PC' is greater than the control signal CS (cf. FIG. 6(d)), and the comparator 16 continuously outputs the comparator signal CO at the high level before the estimated current signal PC' becomes smaller than the control signal CS. Once the estimated current signal PC' becomes smaller than the control signal CS, the comparator 16 outputs the comparator signal CO at the low level. The comparator signal CO becomes high only for a moment during the reset release period, whereas it continuously becomes high over a few cycles of the PWM signal PS during the reset period. On the other hand, where the DC component DC is not more than 0, the estimated current signal PC' is smaller than the control signal CS (cf. FIG. 7(d)), and the comparator 16 outputs the comparator signal CO at the low level before the estimated current signal PC' becomes larger than the control signal CS. Once the estimated current signal PC' reaches the control signal CS, the comparator 16 outputs the comparator signal CO at the high level. The comparator signal CO at the low level is not continuously outputted over one cycle of the PWM signal PS during the reset release period, whereas the low comparator signal is continuously outputted over a few cycles of the PWM signal PS during the reset period.

The RS flip-flop circuit 17 outputs a high signal or a low signal as a source for the PWM signal PS. For that, the RS flip-flop circuit 17 receives the set signal SS and the comparator signal CO (cf. FIGS. 9(b) and (c)).

During a reset release period of the DC component DC, the RS flip-flop circuit 17 turns from low to high with the set signal SS at the high level and holds high. Then the RS flip-flop circuit 17 turns from high to low with the comparator signal CO at the high level and holds low. The frequency of the PWM signal PS is, for example, 100 kH–1 MHz, and is equivalent to the switching frequency in the DC/DC converter 1.

During a reset period of the DC component DC, the high level or the low level of the comparator signal CO of the comparator 16 is continuously outputted over a few cycles of the PWM signal PS. During a period in which the comparator signal CO is outputted continuously at the high level, the RS flip-flop circuit 17 continuously holds low. In this case, the output of the RS flip-flop circuit 17 turns from low to high only for a moment upon a rise of the set signal SS at the high level, but this occurs only for a moment. Therefore, the output is maintained substantially at the low level. When the set signal SS becomes high after switching from high to low of the comparator signal CO, the RS flip-flop circuit 17 then turns from low to high and holds high. On the other hand, during a period in which the comparator signal CO is outputted continuously at the low level, the RS flip-flop circuit 17 remains high. When the comparator signal CO turns from low to high, the RS flip-flop circuit 17 then turns from high to low and holds low.

The set signal SS is a signal resulting from frequency division of the master clock MC by a frequency divider (not shown), and signal that defines one cycle of the PWM signal PS (a switching cycle of the DC/DC converter 1). The set signal SS provides pulses at the high level to define rises from low to high of the PWM signal PS (each pulse corresponding to one cycle of the master clock MC).

The AND circuit 18 limits the pulse width of the PWM signal PS and outputs the PWM signal PS. For that, the AND circuit 18 receives the output signal of the RS flip-flop circuit 17 and the pulse width limiting signal PLS (cf. FIG. 9 (d)). The AND circuit 18 outputs the PWM signal PS at the high level if the output signal of the RS flip-flop circuit 17 is high and if the pulse width limiting signal PLS is high, and otherwise, at the low level (cf. FIGS. 9(d) and (e)). This signal at the high and low levels is the PWM signal PS.

The pulse width limiting signal PLS is a signal resulting from frequency division of the master clock MC by a frequency divider, and the period thereof is the same as that of the PWM signal PS. The pulse width limiting signal PLS provides intervals at the high level to define the maximum pulse width permitted for the PWM signal PS (eventually, a maximum output voltage permitted for the DC/DC converter 1).

During a reset period of the DC component DC, the pulse width limiting signal PLS holds high throughout the entire period, or the output of the RS flip-flop circuit 17 is provided directly as the PWM signal PS, without passing through the AND circuit 18.

Figure 10:
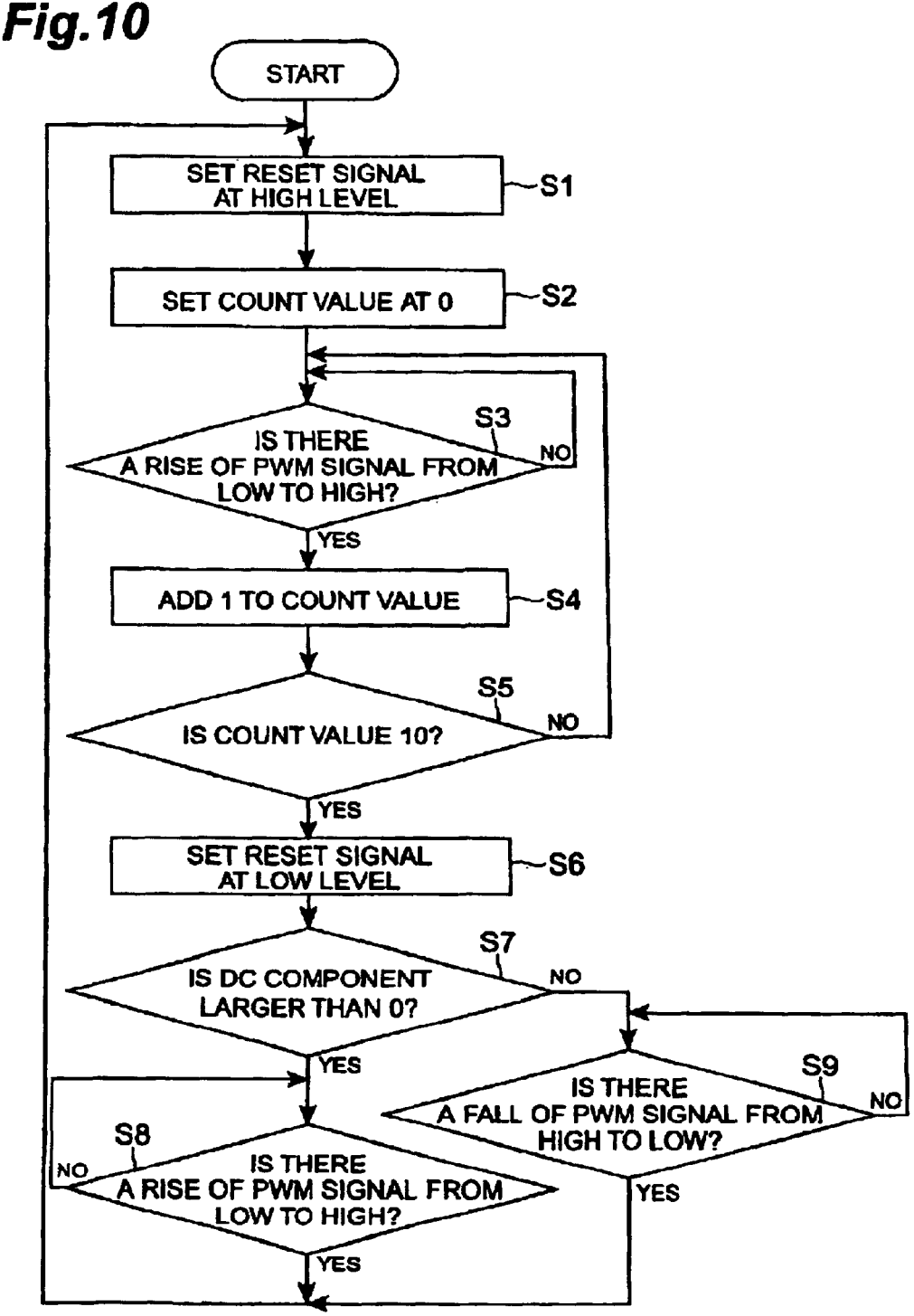
FIG. 10 is a flowchart showing the operation in a reset generating circuit in FIG. 2.

The operations of the controller IC 7A and the DC/DC converter 1 will be described with reference to FIGS. 1 to 9. Particularly, the operation in the reset generating circuit 13 of the controller IC 7A will be described along the flowchart of FIG. 10. FIG. 10 is the flowchart showing the operation in the reset generating circuit in FIG. 2.

The input voltage Vi is fed into the DC/DC converter 1. Then, in the DC/DC converter 1, the switching elements 2, 3 alternately turn on and off on the basis of the PWM signal PS from the controller IC 7A. Furthermore, in the DC/DC converter 1 the inductor 4 and capacitor 5 average the input voltage Vi outputted as pulses during on periods of the switching element 2 to output the voltage Vo. In the DC/DC converter 1, the voltage sensor detects the output voltage Vo and the detected output voltage Vo is digitized by the A/D converter 6 to be fed back to the controller IC 7A.

The controller IC 7A subtracts the output voltage Vo from the target voltage Vr, and multiplies the difference between them by the gain G of P control to generate the control signal CS. The controller IC 7A estimates the inductor current on the basis of the generated PWM signal PS to generate the estimated current signal PC (cf. FIGS. 4(b) and (d)). Furthermore, the controller IC 7A extracts the DC component DC from the estimated current signal PC and subtracts the DC component DC from the estimated current signal PC (cf. FIG. 6(b), FIG. 6(d), FIG. 7(b), and FIG. 7(d)). Then the controller IC 7A compares the control signal CS with the estimated current signal PC' after the removal of the DC component and generates the comparator signal CO to turn high when the estimated current signal PC' reaches the control signal CS (cf. FIGS. 9(a) and (b)). Furthermore, the controller IC 7A outputs the PWM signal PS to provide a pulse from high of the set signal SS to high of the comparator signal CO, while limiting the pulse width by the pulse width limiting signal PLS.

The controller IC 7A also generates the reset signal RS, in order to reset the DC component DC extracted by the low-pass filter 14. First, the controller IC 7A sets the reset signal RS at the high level (cf. S1 in FIG. 10, FIG. 6(c), and FIG. 7(c)) and initializes the count value to 0 (S2 in FIG. 10).

Then the controller IC 7A determines whether the PWM signal PS had a rise from low to high (S3 in FIG. 10), and continues this determination before a rise. With a determination of a rise at S3, the controller IC 7A adds 1 to the counter value (S4 in FIG. 10). Namely, the count value is counted up every lapse of a time equivalent to one cycle of the PWM signal PS.

Subsequently, the controller IC 7A determines whether the count value reaches 10 (S5 in FIG. 10). Before the count value reaches 10, the controller IC 7A transfers to the process at S3 to await a rise of the PWM signal PS. Namely, the controller IC 7A determines here whether a time equivalent to ten cycles of the PWM signal PS has elapsed. During this period, the DC component included in the estimated current signal PC, and the extracted DC component DC continuously increase their amplitude on the plus side or on the minus side (cf. FIG. 6(b) and FIG. 7(b)).

When it is determined at S5 that the counter value reaches 10, the controller IC 7A sets the reset signal RS to the low level (cf. S6 in FIG. 10, FIG. 6(c), and FIG. 7(c)) to move into the control excluding the removal of the DC component. When the reset signal RS turns low, the controller IC 7A resets the extracted DC component DC to approximately 0 (cf. FIG. 6(b), FIG. 6(c), FIG. 7(b), and FIG. 7(c)).

In the case where the DC component DC is positive, the positive DC component DC to be subtracted from the estimated current signal PC becomes null (cf. FIG. 6(b)), so that the estimated current signal PC' rapidly increases (cf. FIG. 6(d)). For this reason, the estimated current signal PC' goes far beyond the value of the control signal CS, and thus the controller IC 7A immediately switches the PWM signal PS from high to low to maintain the PWM signal PS at the low level before the estimated current signal PC' becomes smaller than the control signal CS (cf. FIG. 6(a) and FIG. 6(d)). During a period in which the PWM signal PS is kept low, the estimated current signal PC continuously decreases and, in conjunction therewith, the estimated current signal PC' also decreases continuously (cf. FIG. 6(b) and FIG. 6(d)). Once the estimated current signal PC' becomes smaller than the control signal CS, the controller IC 7A returns to the normal control, and the controller IC 7A switches the PWM signal PS from low to high with a rise of the set signal SS to the high level (cf. FIG. 6(*a*) and FIG. 6(*d*)).

On the other hand, in the case where the DC component DC is negative, the negative DC component DC to be subtracted from the estimated current signal PC becomes null (cf. FIG. 7(*b*)), so that the estimated current signal PC' rapidly decreases (cf. FIG. 7(*d*)). Therefore, the estimated current signal PC' becomes considerably smaller than the control signal CS, and thus the controller IC 7A maintains the PWM signal PS at the high level before the estimated current signal PC' reaches the control signal CS (cf. FIGS. 7(*a*) and (*d*)). During a period in which the PWM signal PS is kept high, the estimated current signal PC continuously increases and, in conjunction therewith, the estimated current signal PC' also increases continuously (cf. FIGS. 7(*b*) and (*d*)). Once the estimated current signal PC' reaches the control signal CS, the controller IC 7A returns to the normal control and the controller IC 7A switches the PWM signal PS from high to low (cf. FIGS. 7(*a*) and (*d*)).

After the reset signal RS is set to the low level, the controller IC 7A determines whether the DC component DC is larger than 0 (S7 in FIG. 10). In passing, if the DC component DC is larger than 0 after switching of the reset signal RS to the low level, the PWM signal PS holds low; and if the DC component DC is not more than 0 the PWM signal PS holds high.

When it is determined at S7 that the DC component DC is larger than 0, the controller IC 7A determines whether the PWM signal PS had a rise from low to high, and continues this determination before a rise (S8 in FIG. 10). With a determination of a rise at S8, the controller IC 7A returns to S1 to set the reset signal RS to the high level, and transfers into the normal control including the removal of the DC component. Returning into the normal control, the estimated current signal PC, having continuously decreased, turns to increase and decrease according to the PWM signal PS, and the DC component DC gradually increases from 0 (cf. FIG. 6(*a*) and FIG. 6(*b*)).

On the other hand, when it is determined at S7 that the DC component DC is not more than 0, the controller IC 7A determines whether the PWM signal PS had a fall from high to low, and continues this determination before a fall (S9 in FIG. 10). With a determination of a fall at S9, the controller IC 7A returns to S1 to set the reset signal RS to the high level, and transfers into the normal control including the removal of the DC component. Returning into the normal control, the estimated current signal PC, having continuously increased, turns to increase and decrease according to the PWM signal PS, and the DC component DC gradually decreases from 0 (cf. FIGS. 7(*a*) and (*b*)).

By intermittently resetting the DC component DC as described above, the accumulated DC component is intermittently removed from the estimated current signal PC, so as to prevent the estimated current signal PC and the DC component DC from infinitely increasing. Therefore, the controller IC 7A is prevented from becoming uncontrollable because of the estimated current signal PC and the DC component DC becoming too large. The estimated current signal PC is kept from deviating from the actual inductor current, which improves the accuracy of estimation of the inductor current. As a consequence, the controller IC 7A is able to perform the current mode control with accuracy close to that in the current mode control based on the actual inductor current.

In passing, the normal control to bring the output voltage Vo close to the target voltage Vr cannot be performed during the reset period. However, since the reset period is sufficiently shorter than the reset release period, the output voltage Vo is controlled toward the target voltage Vr as a whole of the control.

Although this controller IC 7A does not have the current detecting means for detecting the current of the inductor 4, it is able to perform the current mode control by estimating the inductor current. Furthermore, the controller IC 7A removes the DC component DC from the estimated current signal PC and intermittently resets the accumulated DC component DC, whereby the estimated current is made as close to the actual inductor current as possible, so as to improve the accuracy in the current mode control.

The controller IC 7A is able to generate the estimated current signal PC by the simple configuration of the selector 20 and filter 21. Furthermore, the controller IC 7A is able to perform the extraction of the DC component DC and the reset of the DC component DC by the simple configuration of the first-order digital low-pass filter 14.

Figure 11:
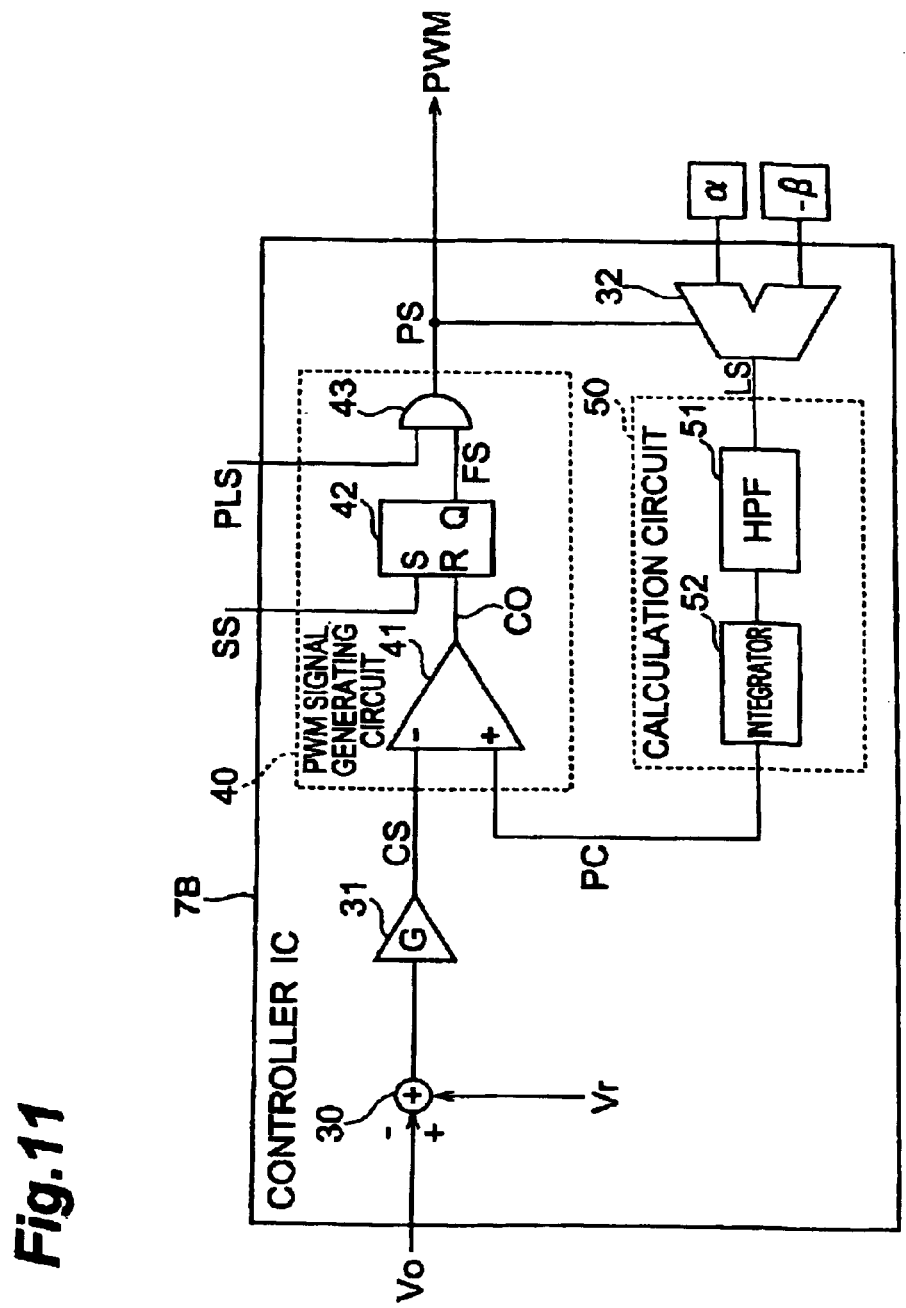
FIG. 11 is a circuit diagram showing a circuit configuration of the controller IC according to the second embodiment.
Figure 12:
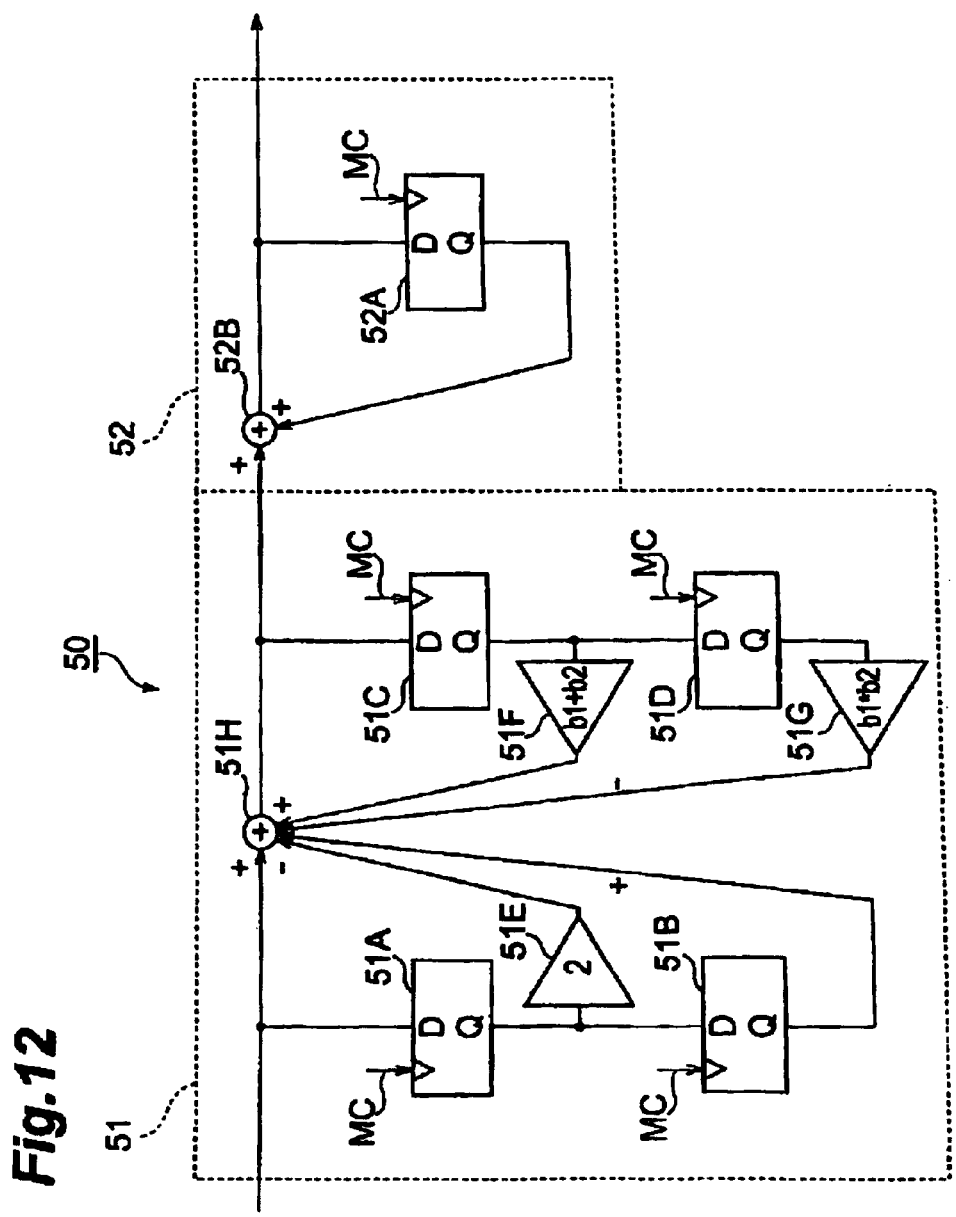
FIG. 12 is a circuit diagram showing a detailed circuit configuration of a calculation circuit in FIG. 11.
Figure 13:
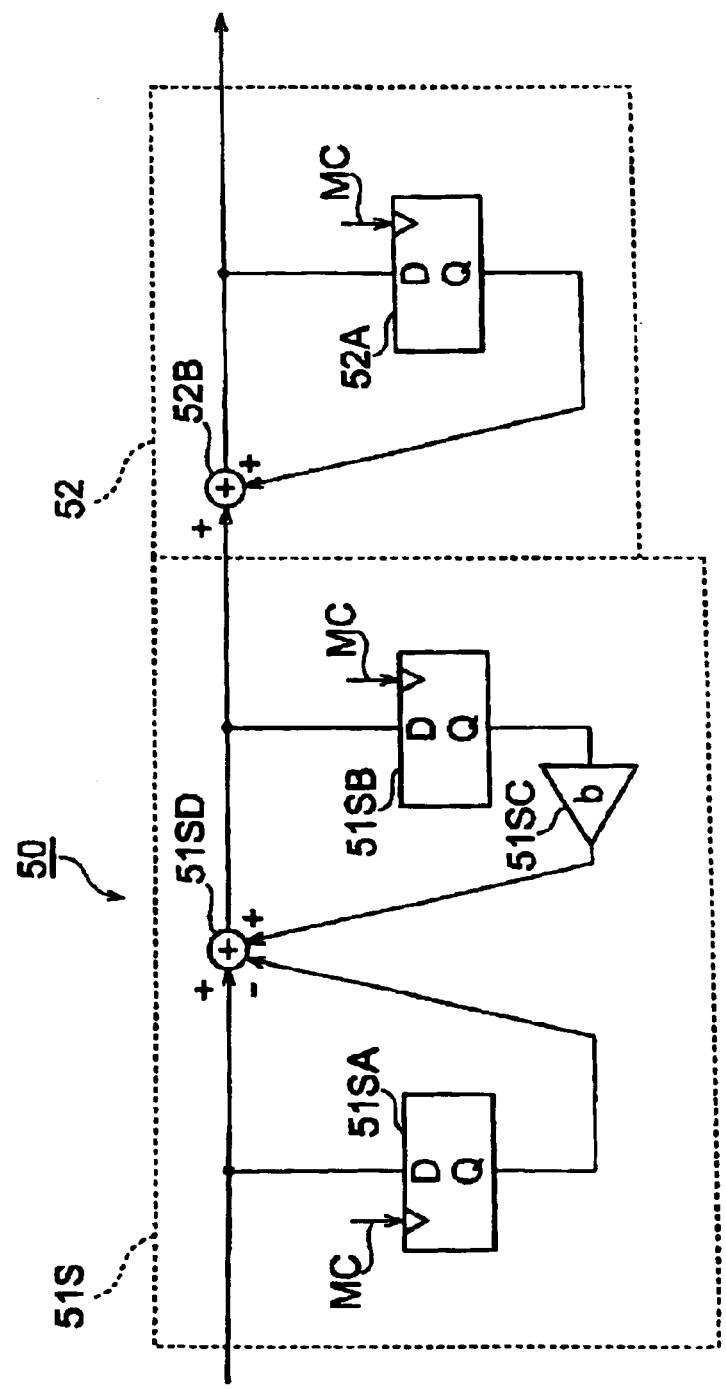
FIG. 13 is a circuit diagram showing another detailed circuit configuration of the calculation circuit in FIG. 11.
Figure 14:
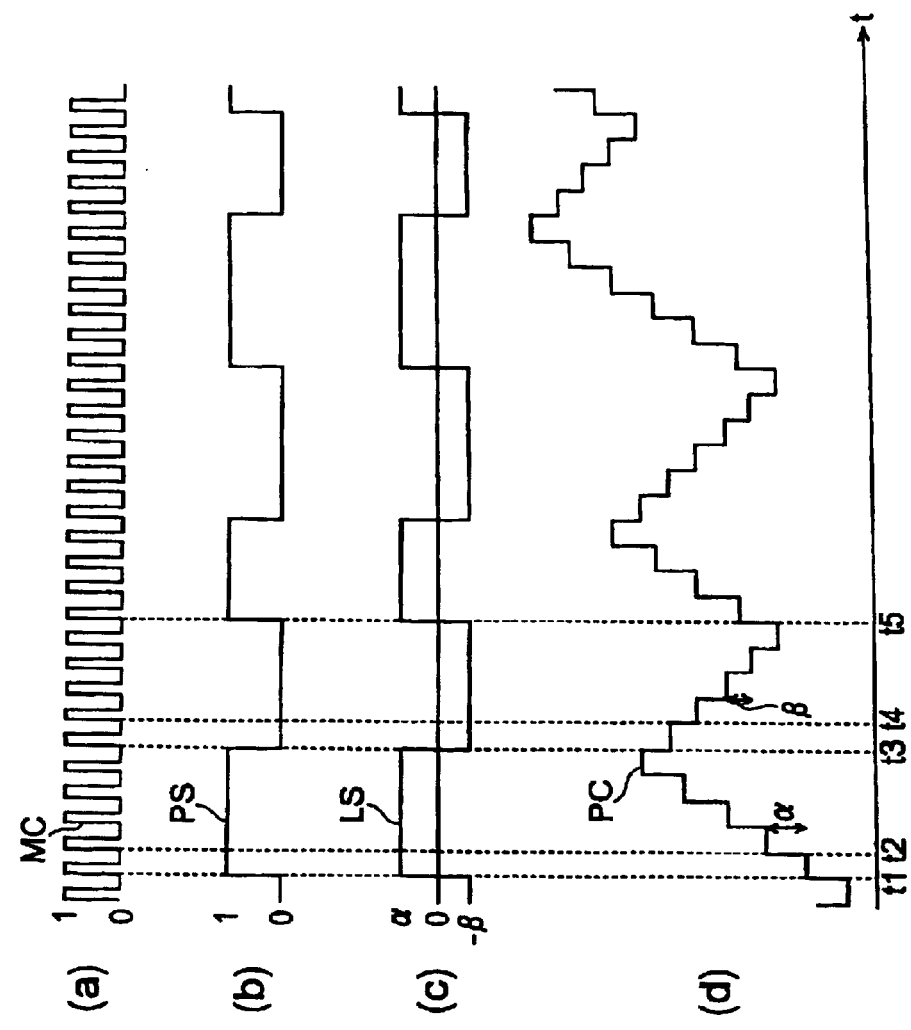
FIG. 14 is a timing chart to illustrate the principle of the estimated current in the controller IC of FIG. 11.
Figure 15:
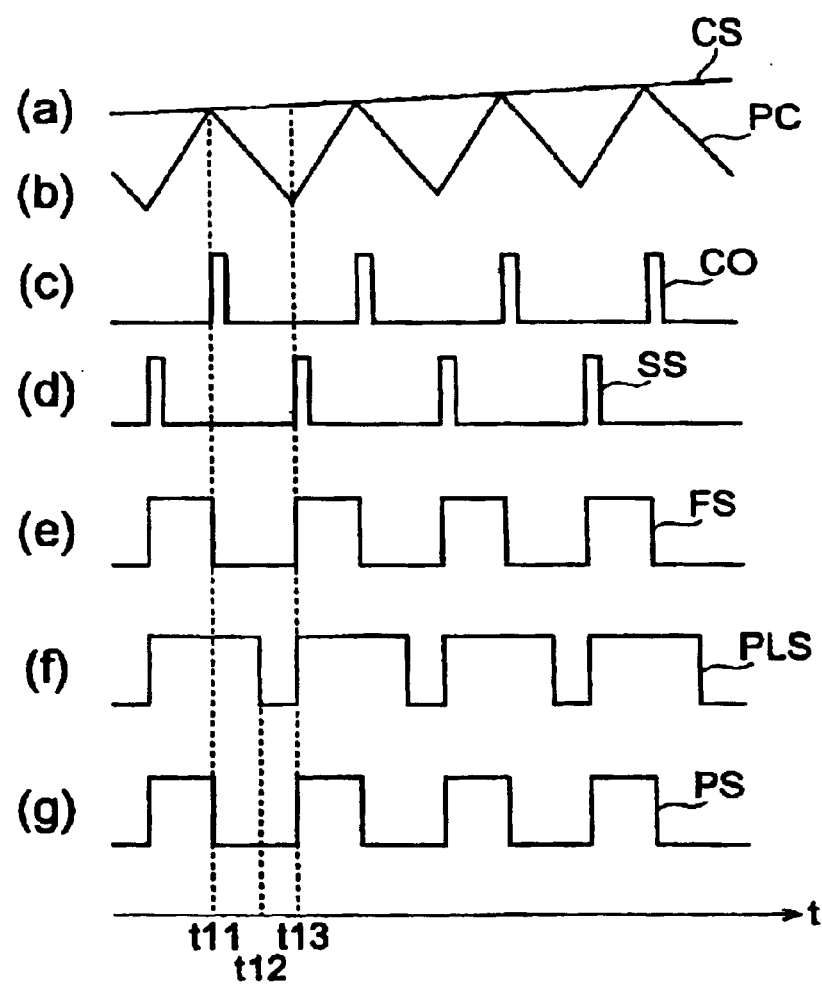
FIG. 15 is a timing chart in a PWM signal generating circuit in FIG. 11.
Figure 16:
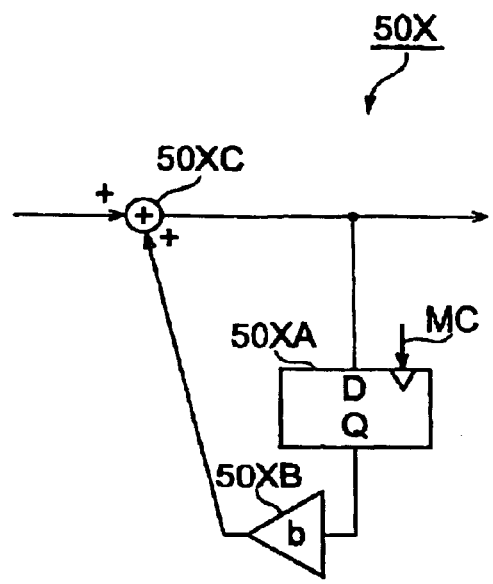
FIG. 16 is a circuit diagram showing a detailed circuit configuration in a modification example of the calculation circuit in FIG. 11.
Figure 17:
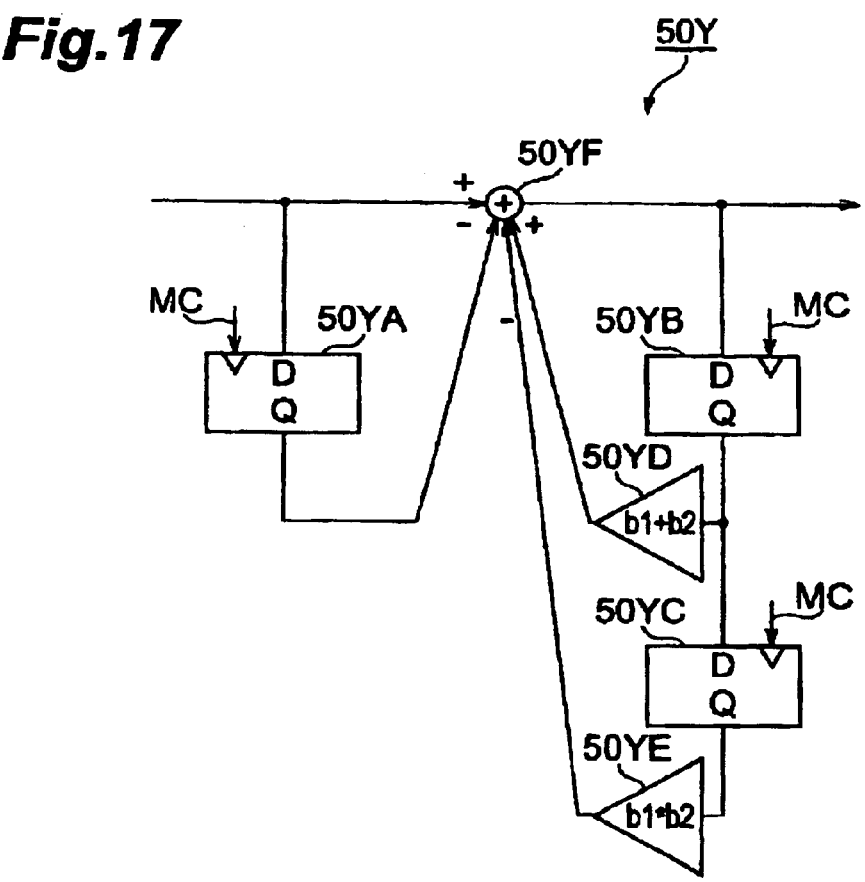
FIG. 17 is a circuit diagram showing a detailed circuit configuration in another modification example of the calculation circuit in FIG. 11.
Figure 18:
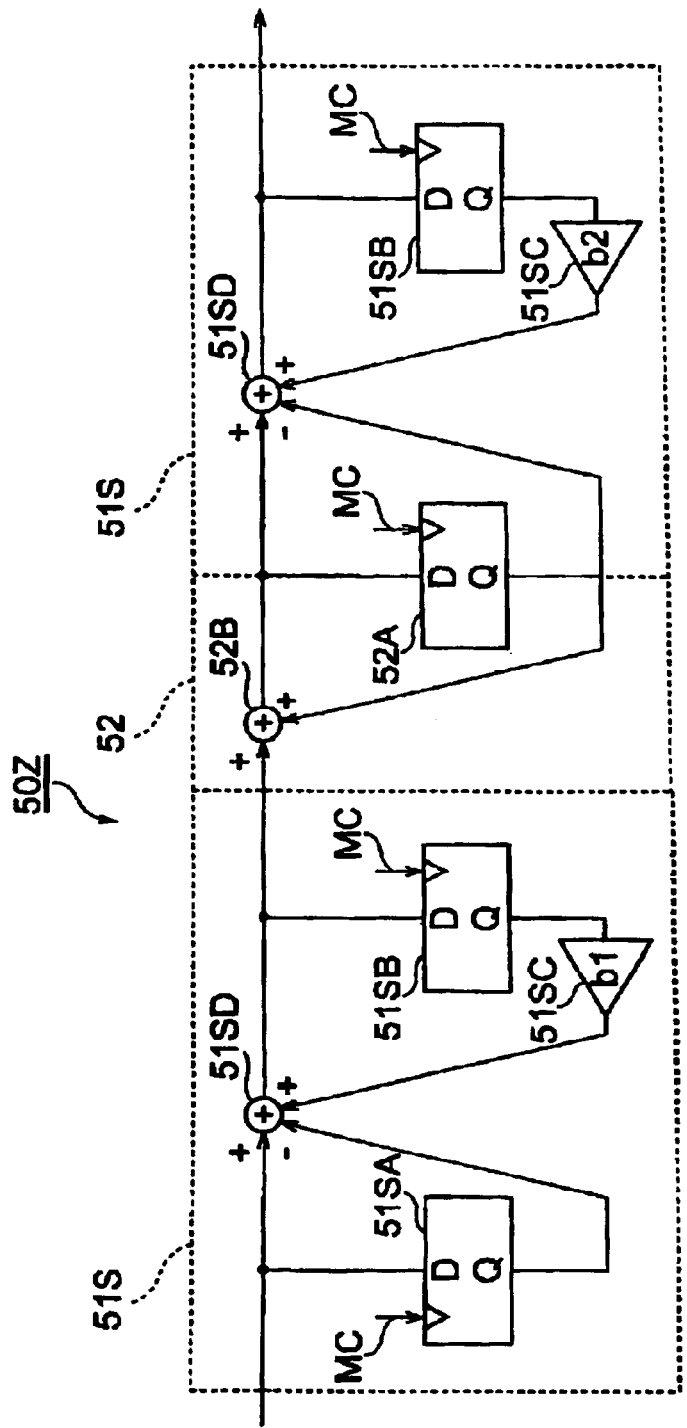
FIG. 18 is a circuit diagram showing a detailed circuit configuration in still another modification example of the calculation circuit in FIG. 11.

The configuration of the controller IC 7B according to the second embodiment will be described below with reference to FIGS. 11 to 18. FIG. 11 is a circuit diagram showing a circuit configuration of the controller IC according to the second embodiment. FIG. 12 is a circuit diagram showing a detailed circuit configuration of the calculation circuit in FIG. 11. FIG. 13 is a circuit diagram showing another detailed circuit configuration of the calculation circuit in FIG. 11. FIG. 14 is a timing chart to illustrate the principle of the estimated current in the controller IC of FIG. 11. FIG. 15 is a timing chart in the PWM signal generating circuit in FIG. 11. FIG. 16 is a circuit diagram showing a detailed circuit configuration in a modification example of the calculation circuit in FIG. 11. FIG. 17 is a circuit diagram showing a detailed circuit configuration in another modification example of the calculation circuit in FIG. 11. FIG. 18 is a circuit diagram showing a detailed circuit configuration in still another modification example of the calculation circuit in FIG. 11.

As shown in FIG. 11, the controller IC 7B is comprised of an adder 30, a multiplier 31, a PWM signal generating circuit (drive signal generating means) 40, a selector (pulse signal outputting means) 32, and a calculation circuit 50.

The adder (subtractor) 30 outputs a signal indicating the value of (Vr–Vo), based on the digital signal indicating the output voltage Vo and the digital signal indicating the target voltage Vr. Namely, the adder 30 adds the output voltage Vo (negative) to the target voltage Vr (positive) to calculate the differential voltage value (Vr–Vo) between the output voltage Vo and the target voltage Vr.

The multiplier 31 outputs the control signal CS indicating the value of G(Vr–Vo), based on the signal indicating the differential voltage value (Vr–Vo). Namely, the multiplier 31 multiplies the differential voltage value (Vr–Vo) between the output voltage Vo and the target voltage Vr by G being a coefficient of the multiplier 31, to calculate the product G(Vr–Vo) being a value resulting from multiplication of the differential voltage value (Vr–Vo) by G.

The PWM signal generating circuit 40 generates the PWM signal PS on the basis of the control signal CS indicating the value of G(Vr–Vo) outputted from the multiplier 31 and the estimated current signal PC (described later) outputted from the calculation circuit 50. As shown in FIG. 11, the PWM signal generating circuit 40 has a comparator (comparing means) 41, an RS flip-flop circuit (switching means) 42, and an AND circuit 43.

The comparator 41 compares the control signal CS indicating the value of G(Vr–Vo) with the estimated current signal PC and outputs the comparator signal CO indicating the result of the comparison between those signals. Namely, the comparator 41 compares the value of G(Vr−Vo) with the value of PC, and outputs the comparator signal CO at the low level if the value of G(Vr−Vo) is larger than the value of PC, but outputs the comparator signal CO at the high level if the value of G(Vr−Vo) is not more than the value of PC. Namely, the comparator signal CO turns to the high level only if the value of PC is not less than the value of G(Vr−Vo).

The RS flip-flop circuit 42 outputs a signal FS, based on the set signal SS generated based on pulses resulting from frequency division of the master clock MC and based on the comparator signal CO outputted from the comparator 41. Namely, the set signal SS is fed into S (Set) being one input side of the RS flip-flop circuit 42, the comparator signal CO is fed into R (Reset) being the other input side, and either the signal FS at the high level or the signal FS at the low level is outputted from Q being the output side.

The AND circuit 43 outputs the PWM signal PS being the drive signal for the switching elements 2, 3, based on the pulse width limiting signal PLS generated based on pulses resulting from frequency division of the master clock MC and based on the signal FS outputted from the RS flip-flop circuit 42. Namely, the AND circuit 43 calculates a logical product of the pulse width limiting signal PLS and the signal FS and outputs the calculation result as the PWM signal PS.

The selector 32 outputs a pulse signal LS indicating a level value of either "α" or "−β" based on the PWM signal PS. Here the value of "α" is a slope in increase of the real current flowing through the inductor 4 of the DC/DC converter 1, and the value of "−β" a value indicating a slope in decrease of the real current flowing through the inductor 4. Therefore, by using these values of "α" and "−β," it becomes feasible to estimate the real current flowing through the inductor 4. In the second embodiment, the signal PC that can be generated based on the pulse signal LS having the level values of "α" and "−β" will thus be described as an estimated current signal. In the second embodiment the DC/DC converter 1 performs the constant voltage control using this estimated current signal PC. The values of "α" and "−β" are generally determined by the circuit configuration of the DC/DC converter 1 and are values preliminarily set in the selector 32.

The calculation circuit 50 outputs the estimated current signal PC, based on the pulse signal LS outputted from the selector 32. As shown in FIG. 11, the calculation circuit 50 herein has a high-pass filter (HPF) 51 and an integrator 52.

The high-pass filter 51 is a second-order high-pass filter, and is a filter circuit for removing the DC component included in the pulse signal LS from the selector 32. Since the high-pass filter 51 is provided, the DC component included in the pulse signal LS is removed thereby, so that the signal without the DC component can be fed into the integrator 52.

The integrator 52 is a circuit that integrates the signal after the removal of the DC component by the high-pass filter 51. By providing the integrator 52, it becomes feasible to integrate the pulse signal LS having the level values of "α" and "−β" as described above. Namely, it is feasible to integrate the pulse signal after the removal of the DC component. This can prevent the estimated current signal PC from the integrator 52 from diverging because of the influence of the DC component. Since the controller IC 7B is provided with the calculation circuit 50 comprised of the high-pass filter 51 and integrator 52 as described above, it is able to generate the estimated current signal PC, without being affected by the DC component which can be the cause of error from the real current, and thus it becomes feasible to generate the estimated current closer to the real current. Accordingly, the DC/DC converter 1 in the second embodiment does not have to be provided with the means for correcting the value of the estimated current signal to the real current value (e.g., a current detector for detecting the real current value, or the like), which can simplify the configuration of the DC/DC converter 1.

A detailed circuit configuration of the calculation circuit 50 will be described below with reference to FIG. 12. As shown in FIG. 12, the calculation circuit 50 has a second-order high-pass filter 51 and an integrator 52. The second-order high-pass filter 51 is composed of D flip-flop circuits 51A–51D being delay devices, a multiplier 51E with the multiplication coefficient of "2," a multiplier 51F with the multiplication coefficient of "b1+b2," a multiplier 51G with the multiplication coefficient of "b1*b2," and an adder 51H. This circuit configuration is implemented based on a transfer function H(Z) of the high-pass filter 51 represented by Eq (3) below.

$$H(Z)=[(1-Z^{-1})/(1-b1*Z^{-1})]*[(1-Z^{-1})/(1-b2*Z^{-1})] \quad (3) \text{ (b1 and b2 are coefficients)}$$

The integrator 52 of the calculation circuit 50 is composed of a D flip-flop circuit 52A being a delay device, and an adder 52B. This circuit configuration is implemented based on a transfer function H(Z) of the integrator 52 represented by Eq (4) below.

$$H(Z)=1/(1-Z^{-1}) \quad (4)$$

Although the second embodiment describes a case where the high-pass filter 51 is the second-order high-pass filter, there is no need for limiting the high-pass filter 51 to the second-order high-pass filter. Namely, the high-pass filter 51 can be any high-pass filter as long as it is a first or higher-order high-pass filter. Here is a case in which the calculation circuit 50 is composed of a first-order high-pass filter 51S and an integrator 52, and a detailed circuit diagram thereof is presented in FIG. 13. The calculation circuit 50 in this configuration will be described below. As shown in FIG. 13, the first-order high-pass filter 51S has D flip-flop circuits 51SA, 51SB being delay devices, a multiplier 51SC with the multiplication coefficient of "b," and an adder 51SD. This circuit configuration is implemented based on a transfer function H(Z) of the high-pass filter 51S represented by Eq (5) below.

$$H(Z)=(1-Z^{-1})/(1-b*Z^{-1}) \quad (5) \text{ (b is a coefficient)}$$

The principle of generating the estimated current signal PC will be described below with reference to the timing chart shown in FIG. 14. FIG. 14(a) is an illustration showing the pulse waveform of the master clock MC serving as a reference signal in various controls in the DC/DC converter 1. As shown in FIG. 14(a), the master clock MC provides alternate output signals of the low level "0" and the high level "1" at fixed intervals. FIG. 14(b) is an illustration showing the pulse waveform of the PWM signal PS outputted from the AND circuit 43 of the controller IC 7B. As shown in FIG. 14(b), the PWM signal PS provides alternate output signals of the low level "0" and the high level "1" FIG. 14(c) is an illustration showing the pulse waveform of the pulse signal LS outputted from the selector 32 of the controller IC 7B. As shown in FIG. 14(c), the pulse signal LS provides alternate output signals with the level value of "α" and with the level value of "−β." FIG. 14(d) is an illustration showing the digital waveform of the estimated current signal PC outputted from the calculation circuit 50 of the controller IC 7B. As shown in FIG. 14(*d*), the estimated current signal PC repeatedly provides an output signal stepwise increasing by the "α" level each during an increase period of the estimated current signal PC, and repeatedly provides an output signal stepwise decreasing by the "β" level each during a decrease period of the estimated current signal PC. Each of the signals shown in FIGS. 14(*b*) to 14(*d*) switches its level in synchronism with a rise of a predetermined pulse in the master clock MC shown in FIG. 14(*a*).

First, when at a time t1 the PWM signal PS turns from the low level to the high level as shown in FIG. 14(*b*), the pulse signal LS turns from the "−β" level to the "α" level (cf. FIG. 14(*c*)). When at a time t3 the PWM signal PS turns from the high level to the low level (cf. FIG. 14(*b*)), the pulse signal LS turns from the "α" level to the "−β" level (cf. FIG. 14(*c*)). Namely, the pulse signal LS provides the output signal with the level value of "α" during a period in which the PWM signal PS is at the high level (e.g., a period between times t1 and t3), but provides the output signal with the level value of "−β" during a period in which the PWM signal PS is at the low level (e.g., a period between times t3 and t5).

On the other hand, when at the time t1 the pulse signal LS turns from the "−β" level to the "α" level (cf. FIG. 14(*c*)), the estimated current signal PC increases its level by the "α" level every rise of the master clock MC (e.g., times t1, t2) (cf. FIG. 14(*d*)). When at the time t3 the pulse signal LS turns from the "α" level to the "−β" level (cf. FIG. 14(*c*)), the estimated current signal PC decreases its level by the "β" level every rise of the master clock MC (e.g., times t3, t4) (cf. FIG. 14(*d*)). In this manner, the estimated current signal PC increases its level value by the "α" level every rise of the master clock MC during a period in which the PWM signal PS is at the high level (e.g., the period between times t1 and t3), but decreases its level by the "β" level every rise of the master clock MC during a period in which the PWM signal PS is at the low level (e.g., the period between times t3 and t5).

This indicates that the DC/DC converter 1 in the second embodiment is configured so that, with the PWM signal PS at the high level, the switching element 2 of the DC/DC converter 1 is turned on to increase the current flowing through the inductor 4, by the slope "α" and so that, with the PWM signal PS at the low level, the switching element 3 of the DC/DC converter 1 is turned on to decrease the current flowing through the inductor 4, by the slope "β."

The flow of signals in the PWM signal generating circuit 40 of the controller IC 7B will be described below with reference to the timing chart shown in FIG. 15. FIG. 15(*a*) is an illustration showing the waveform of the control signal CS outputted from the multiplier 31 of the controller IC 7B. FIG. 15(*b*) is an illustration showing the waveform of the estimated current signal PC outputted from the calculation circuit 50 of the controller IC 7B. As shown in FIG. 15(*b*), the estimated current signal PC increases before an arrival at the value of the control signal CS shown in FIG. 15(*a*), and turns to decrease after an arrival at the value of the control signal CS. FIG. 15(*c*) is an illustration showing the pulse waveform of the comparator signal CO outputted from the comparator 41. As shown in FIG. 15(*c*), the comparator signal CO is a signal outputted while alternately repeating the low level and the high level. FIG. 15(*d*) is an illustration showing the pulse waveform of the set signal SS generated based on the master clock MC of the DC/DC converter 1. As shown in FIG. 15(*d*), the set signal SS is a signal outputted while alternately repeating the low level and the high level at predetermined intervals. FIG. 15(*e*) is an illustration showing the pulse waveform of the signal FS outputted from the RS flip-flop circuit 42. As shown in FIG. 15(*e*), the signal FS is a signal outputted while alternately repeating the low level and the high level. FIG. 15(*f*) is an illustration showing the pulse waveform of the pulse width limiting signal PLS generated based on the master clock MC. As shown in FIG. 15(*f*), the pulse width limiting signal PLS is a signal outputted while alternately repeating the low level and the high level at predetermined intervals. FIG. 15(*g*) is an illustration showing the pulse waveform of the PWM signal PS outputted from the AND circuit 43. As shown in FIG. 15(*g*), the PWM signal PS is a signal outputted while alternately repeating the low level and the high level.

First, when at a time t11 the value of the estimated current signal PC reaches the value of the control signal CS (cf. FIGS. 15(*a*) and (*b*)), the comparator signal CO outputted from the comparator 41 turns from the low level to the high level (cf. FIG. 15 (*c*)). When the comparator signal CO turns from the low level to the high level (cf. FIG. 15(*c*)), the signal FS outputted from the RS flip-flop circuit 42 is reset to turn from the high level to the low level (cf. FIG. 15(*e*)). When the signal FS turns from the high level to the low level (cf. FIG. 15(*e*)), the PWM signal PS outputted from the AND circuit 43 turns from the high level to the low level (cf. FIG. 15(*g*)). Namely, when the value of the estimated current signal PC reaches the value of G(Vr−Vo), the PWM signal PS being the drive signal turns from the on state (high level) to the off state (low level).

When at a time t12 the pulse width limiting signal PLS turns from the high level to the low level (cf. FIG. 15(*f*)), the PWM signal PS outputted from the AND circuit 43 is forced to the low level (cf. FIG. 15(*g*)). Namely, the pulse width limiting signal PLS has a function of limiting an on period in which the PWM signal PS as a drive signal is kept in the on state (high level).

When at a time t13 the set signal SS turns from the low level to the high level (cf. FIG. 15(*d*)), the signal FS outputted from the RS flip-flop circuit 42 is set to switch from the low level to the high level (cf. FIG. 15(*e*)). When the signal FS turns from the low level to the high level (cf. FIG. 15(*e*)), the PWM signal PS outputted from the AND circuit 43 turns from the low level to the high level (cf. FIG. 15(*g*)). Namely, when the set signal SS turns from the low level to the high level, the PWM signal PS as a drive signal turns from the off state (low level) to the on state (high level).

Therefore, the PWM signal generating circuit 40 switches the PWM signal PS from the off state to the on state every turn of the set signal SS from the low level to the high level, and switches the PWM signal PS from the on state to the off state every time the value of the estimated current signal PC reaches the value of G(Vr−Vo).

In the DC/DC converter 1 in the second embodiment, as described above, the controller IC 7B is provided with the above-stated selector 32 to output the pulse signal LS with the predetermined level value ("α" and "−β") corresponding to the output level of the PWM signal PS, whereby it can output the pulse signal indicating the slopes ("α" and "−β") in increase and in decrease of the estimated current.

Since the controller IC 7B is provided with the calculation circuit 50 composed of the high-pass filter 51 and integrator 52, the integrator 52 integrates the pulse signal LS after the removal of the DC component by the high-pass filter 51, whereby the estimated current signal PC after the integration can be prevented from diverging because of the influence of the DC component and whereby the error from the real current due to the influence of the DC component can be minimized. In this manner, the estimated current signal PC is generated without being affected by the DC component that can be the cause of error from the real current, whereby the estimated current can be generated nearer to the real current. Accordingly, the controller IC does not have to be provided with the means for correcting the value of the estimated current signal to the real current value, which can achieve simplification of the configuration of the DC/DC converter 1.

Since the drive signal is generated based on the estimated current signal closer to the real current, it becomes feasible to perform the control closer to the current mode control using the real current, whereby the DC/DC converter 1 required to have the quick response property can be made to perform stabler constant voltage control.

Since the DC/DC converter 1 according to the second embodiment is able to perform the stable constant voltage control based on the estimated current signal with less error as described above, it can perform the stable constant voltage control while minimizing the influence of error, even in applications to equipment that involves quick increase of load variation and that is required to have the quick response property, for example, like PC terminals configured to make transition from the power-saving mode to the normal mode, or the like.

The second embodiment described a case where the calculation circuit 50 was composed of the high-pass filter 51 and the integrator 52, but the configuration of the calculation circuit 50 is not limited to this example. For example, the calculation circuit may be constructed in one of circuit configurations as shown in FIGS. 16 to 18. FIG. 16 is an illustration showing a detailed circuit configuration of a calculation circuit 50X integrally having the function of the first-order high-pass filter and the function of the integrator. The circuit configuration of this calculation circuit 50X herein does not include a circuit configuration of combination of the first-order high-pass filter and integrator separately provided in succession. The calculation circuit 50X shown in FIG. 16 has a D flip-flop circuit 50XA being a delay device, a multiplier 50XB with the multiplication coefficient of "b," and an adder 50XC. This circuit configuration is implemented based on a transfer function H(Z) of the calculation circuit 50X represented by Eq (6) below.

$$H(Z)=1/(1-b*Z^{-1}) \quad (6) \text{ (b is a coefficient)}$$

This Eq (6) is obtained by multiplying the transfer function Eq (5) of the aforementioned first-order high-pass filter by the transfer function Eq (4) of the integrator.

FIG. 17 is an illustration showing a detailed circuit configuration of another calculation circuit 50Y as an integration of a second-order high-pass filter and an integrator. The calculation circuit SOY shown in FIG. 17 has D flip-flop circuits 50YA–50YC being delay devices, a multiplier 50YD with the multiplication coefficient of "b1+b2," a multiplier 50YE with the multiplication coefficient of "b1*b2," and an adder 50YF. This circuit configuration is implemented based on a transfer function H(Z) of the calculation circuit 50Y represented by Eq (7) below.

$$H(Z)=(1-Z^{-1})/[(1-b1*Z^{-1})(1-b2*Z^{-1})]$$
(b1 and b2 are coefficients)

This Eq (7) is obtained by multiplication of the transfer function Eq (3) of the aforementioned second-order high-pass filter by the transfer function Eq (4) of the integrator.

FIG. 18 is an illustration showing a detailed circuit configuration of still another calculation circuit 50Z having first-order high-pass filters 51S and an integrator 52. As shown in FIG. 18, the integrator 52 is interposed between the two first-order high-pass filters 51S, receives a signal outputted from one first-order high-pass filter 51S, and outputs a signal after multiplication in this integrator 52 to the other first-order high-pass filter 51S. A delay device 52A shown in FIG. 18 is shared by the integrator 52 and the first-order high-pass filter 51S disposed on the output side of the integrator 52. This circuit configuration is implemented based on the transfer function of the first-order high-pass filter represented by Eq (5) above and based on the transfer function of the integrator represented by Eq (4).

The embodiments of the present invention were described above, but it is noted that the present invention can be embodied in a variety of forms, without having to be limited to the above embodiments.

For example, the controller was constructed of the digital circuit (hardware) in the embodiments, but each of the means in the controller may also be configured so as to be implemented by a program (software) loaded on a microcomputer or the like. The program to implement each means may also be distributed by recording media such as CD-ROM and others, or by delivery through the Internet or the like, or distributed as a control unit installed in a computer.

The present invention was applied to the DC/DC converter in the embodiments, but the present invention is also applicable to AC/DC converters and DC/AC converters. The present invention was applied to the non-insulating and buck type converter without a transformer in the embodiments, but the present invention is also applicable to insulated converters with a transformer and also to boost type or buck/boost type converters.

The present invention was applied to P control in the embodiments, but the present invention is also applicable to the other controls including PI control and PID control.

In the first embodiment the means for extracting the DC component was composed of the first-order low-pass filter of the IIR type, but it may also be composed of any other low-pass filter such as a second-order low-pass filter or the like, or may be comprised of any other circuit than the low-pass filter.

In the first embodiment the signal to reset the DC component was defined as a reset signal of the period equivalent to ten cycles of the PWM signal (ten switching cycles), but the period may be set to be the other number of cycles than ten cycles of the PWM signal or it does not have to be an integral multiple of cycles of the PWM signal as long as the period is sufficiently longer than the period of the master clock. In cases where the reset signal is not set to be an integral multiple of cycles of the PWM signal, the reset signal is set on the basis of cycles of the master clock or the like. In the embodiments the number of cycles of the PWM signal was counted on the basis of the PWM signal, but it may also be counted by use of the set signal or the like.

The first embodiment employed the separate configuration of the A/D converter and the controller IC, but it is also possible to adopt a configuration wherein the A/D converter is incorporated in the controller IC.

The present invention has achieved the technology of estimating the inductor current on the basis of the drive signal, removing the DC component from the estimated current, and intermittently resetting the DC component, thereby enabling the current mode control without need for the means for detecting the inductor current flowing in the switching power supply circuit.

The present invention has achieved the more simplified configurations of the switching power supply in digital control.

What is claimed is:

1. A switching power supply controller comprising:
control signal setting means for setting a control signal on the basis of an output voltage digitally converted in a switching power supply, and a target voltage;
current estimating means for estimating an electric current flowing through an inductor of a smoothing circuit in the switching power supply, on the basis of a drive signal for controlling a switching element of the switching power supply, and for generating an estimated current signal;
DC component removing means for extracting a DC component included in the estimated current signal estimated by the current estimating means and for removing the DC component from the estimated current signal;
DC component resetting means for resetting the DC component extracted by the DC component removing means, every predetermined time; and
comparing means for comparing the control signal set by the control signal setting means, with the estimated current signal after the removal of the DC component by the DC component removing means, and for detecting whether the estimated current signal after the removal of the DC component reaches the control signal.

2. The switching power supply controller according to claim 1, wherein the DC component removing means comprises:
a low-pass filter for extracting the DC component from the estimated current signal; and
a subtractor for subtracting the DC component extracted by the low-pass filter, from the estimated current signal generated by the current estimating means.

3. The switching power supply controller according to claim 2, wherein the DC component resetting means feeds a reset signal to the low-pass filter and resets an output from a delay device of the low-pass filter every predetermined time.

4. The switching power supply controller according to claim 1, wherein the predetermined time is an integral multiple of a period of the drive signal.

5. The switching power supply controller according to claim 1, wherein the current estimating means comprises an up-down counter for counting up every given time on the basis of an up coefficient during an on period of the switching element in the drive signal and for counting down every given time on the basis of a down coefficient during an off period of the switching element in the drive signal.

6. A switching power supply comprising:
a controller for generating a drive signal for switching control of a switching element by digital control; and
a switching element configured to turn on and off based on the drive signal generated by the controller,
wherein the controller is the controller as set forth in claim 1.

7. A switching power supply controller comprising:
drive signal generating means for generating a drive signal to be outputted to a switching power supply;
pulse signal outputting means for outputting a pulse signal having a predetermined level value corresponding to an output level of the drive signal generated by the drive signal generating means;
high-pass filter means for removing a DC component included in the pulse signal outputted by the pulse signal outputting means; and
integrating means for integrating a signal resulting from the removal of the DC component by the high-pass filter means,
wherein the drive signal generating means generates the drive signal on the basis of signals indicating an output voltage of the switching power supply and a target voltage for the output voltage and on the basis of a signal resulting from the integration by the integrating means.

8. The switching power supply controller according to claim 7, wherein the high-pass filter means is a second or higher-order high-pass filter.

9. The switching power supply controller according to claim 7, wherein the drive signal generating means comprises:
comparing means for comparing a signal indicating a difference between the output voltage and the target voltage, with the signal resulting from the removal of the DC component; and
switching means for switching the level of the drive signal from a low level to a high level at a predetermined interval and for switching the level of the drive signal from the high level to the low level on the basis of a result of the comparison by the comparing means.

10. A switching power supply comprising:
a controller for generating a drive signal for switching control of a switching element by digital control; and
a switching element configured to turn on and off based on the drive signal generated by the controller,
wherein the controller is the controller as set forth in claim 7.

11. A switching power supply controller comprising:
drive signal generating means for generating a drive signal to be outputted to a switching power supply;
pulse signal outputting means for outputting a pulse signal having a predetermined level value corresponding to an output level of the drive signal generated by the drive signal generating means; and
calculation means integrally having a function of integrating the pulse signal outputted by the pulse signal outputting means and a high-pass filter function of removing a DC component from the pulse signal,
wherein the drive signal generating means generates the drive signal on the basis of signals indicating an output voltage of the switching power supply and a target voltage for the output voltage and on the basis of a signal resulting from calculation by the calculation means.

12. The switching power supply controller according to claim 11, wherein the calculation means is configured based on a transfer function H(Z) of the calculation means as defined below:

$$H(Z)=1/(1-b*Z^{-1}) \text{ (b is a coefficient).}$$

13. The switching power supply controller according to claim 11, wherein the calculation means is configured based on a transfer function H(Z) of the calculation means as defined below:

$$H(Z)=(1-Z^{-1})/[(1-b1*Z^{-1})(1-b2*Z^{-1})] \text{ (b1 and b2 are coefficients).}$$

14. The switching power supply controller according to claim 11, wherein the drive signal generating means comprises:

comparing means for comparing a signal indicating a difference between the output voltage and the target voltage, with the signal resulting from the removal of the DC component; and switching means for switching the level of the drive signal from a low level to a high level at a predetermined interval and for switching the level of the drive signal from the high level to the low level on the basis of a result of the comparison by the comparing means.

15. A switching power supply comprising:

a controller for generating a drive signal for switching control of a switching element by digital control; and a switching element configured to turn on and off based on the drive signal generated by the controller, wherein the controller is the controller as set forth in claim 11.

16. A switching power supply controller comprising:

drive signal generating means for generating a drive signal to be outputted to a switching power supply;

pulse signal outputting means for outputting a pulse signal having a predetermined level value corresponding to an output level of the drive signal generated by the drive signal generating means;

a first high-pass filter for removing a DC component included in the pulse signal outputted by the pulse signal outputting means;

integrating means for integrating a signal resulting from the removal of the DC component by the first high-pass filter; and a second high-pass filter for removing a DC component included in a signal resulting from the integration by the integrating means, wherein the drive signal generating means generates the drive signal on the basis of signals indicating an output voltage of the switching power supply and a target voltage for the output voltage and on the basis of a signal resulting from the removal of the DC component by the second high-pass filter.

17. The switching power supply controller according to claim 16, wherein the first high-pass filter and the second high-pass filter are first-order high-pass filters.

18. The switching power supply controller according to claim 16, wherein the drive signal generating means comprises:

comparing means for comparing a signal indicating a difference between the output voltage and the target voltage, with the signal resulting from the removal of the DC component; and switching means for switching the level of the drive signal from a low level to a high level at a predetermined interval and for switching the level of the drive signal from the high level to the low level on the basis of a result of the comparison by the comparing means.

19. A switching power supply comprising:

a controller for generating a drive signal for switching control of a switching element by digital control; and a switching element configured to turn on and off based on the drive signal generated by the controller, wherein the controller is the controller as set forth in claim 16.

* * * * *